US012593061B2

(12) United States Patent
Cao et al.

(10) Patent No.: US 12,593,061 B2
(45) Date of Patent: Mar. 31, 2026

(54) DECODING METHOD AND APPARATUS, CODING METHOD AND APPARATUS, DEVICE, AND STORAGE MEDIUM

(71) Applicant: HANGZHOU HIKVISION DIGITAL TECHNOLOGY CO., LTD., Hangzhou (CN)

(72) Inventors: Xiaoqiang Cao, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 144 days.

(21) Appl. No.: 18/568,099

(22) PCT Filed: Jun. 6, 2022

(86) PCT No.: PCT/CN2022/097124
§ 371 (c)(1),
(2) Date: Dec. 7, 2023

(87) PCT Pub. No.: WO2023/273802
PCT Pub. Date: Jan. 5, 2023

(65) Prior Publication Data
US 2024/0276005 A1 Aug. 15, 2024

(30) Foreign Application Priority Data
Jun. 30, 2021 (CN) .......................... 202110739455.5

(51) Int. Cl.
*H04N 19/51* (2014.01)
*H04N 19/103* (2014.01)
(Continued)

(52) U.S. Cl.
CPC ........... *H04N 19/51* (2014.11); *H04N 19/103* (2014.11); *H04N 19/139* (2014.11); *H04N 19/70* (2014.11)

(58) Field of Classification Search
CPC .... H04N 19/51; H04N 19/103; H04N 19/139; H04N 19/70; H04N 19/109;
(Continued)

(56) References Cited

U.S. PATENT DOCUMENTS 8,165,411 B2 4/2012 Park
9,516,317 B2 12/2016 Jung et al.
(Continued)

FOREIGN PATENT DOCUMENTS

CN      110855998      2/2020
CN      110855998 A  *  2/2020  ........... H04N 19/503
(Continued)

OTHER PUBLICATIONS

International Search Report in International Appln. No. PCT/CN2022/097124, mailed on Jul. 27, 2022, 4 pages (with English translation).
(Continued)

*Primary Examiner* — Maria E Vazquez Colon
(74) *Attorney, Agent, or Firm* — Fish & Richardson P.C.

(57) ABSTRACT

Decoding methods and apparatuses, coding methods and apparatuses, devices and machine-readable storage media are provided. In an example of the decoding method, for a received bitstream, by parsing a motion information index value of a skip mode or a direct mode of a current coding unit, a candidate list of the skip mode or the direct mode may be constructed, and determining a prediction mode of the current coding unit, thus, motion compensation can be performed on the current coding unit according to motion information of the current coding unit acquired from the prediction mode of the current coding unit. The motion
(Continued)

information index value of the skip mode or the direct mode of the current coding unit is obtained by parsing according to the number of motion vector angle prediction candidate motion information and the number of inter-prediction candidate historical motion vector prediction information.

13 Claims, 8 Drawing Sheets

(51) Int. Cl.
  *H04N 19/139* (2014.01)
  *H04N 19/70* (2014.01)
(58) Field of Classification Search
  CPC ...... H04N 19/176; H04N 19/52; H04N 19/44; H04N 19/147; H04N 19/157
  See application file for complete search history.

(56) References Cited

U.S. PATENT DOCUMENTS

| | | | | |
|---|---|---|---|---|
| 10,284,860 | B1 * | 5/2019 | Zhao ..................... | H04N 19/176 |
| 10,659,804 | B2 | 5/2020 | Kim et al. | |
| 2020/0112739 | A1 | 4/2020 | Xu et al. | |
| 2020/0236352 | A1 * | 7/2020 | Lee ...................... | H04N 19/184 |

FOREIGN PATENT DOCUMENTS

| | | | | |
|---|---|---|---|---|
| CN | 111010579 | | 4/2020 | |
| CN | 111970512 | | 11/2020 | |
| CN | 112073733 | | 12/2020 | |
| CN | 112073733 | A * | 12/2020 | ........... H04N 19/503 |
| CN | 112291565 | | 1/2021 | |
| CN | 112565747 | | 3/2021 | |
| CN | 112565747 | A * | 3/2021 | ........... H04N 19/176 |
| CN | 113709456 | | 11/2021 | |
| CN | 113794877 | | 12/2021 | |
| JP | 2012019447 | A | 1/2012 | |
| JP | 2015525999 | A | 9/2015 | |
| RU | 2486691 | C1 | 6/2013 | |
| TW | 202107894 | | 2/2021 | |

OTHER PUBLICATIONS

Extended European Search Report in European Appln. No. 22831623.8, mailed on Sep. 19, 2024, 12 pages.

Ken Lawrence Hisilicon Technologies Co. Ltd., "TM-D1AVC1213r0-AVS3-P2 spec-20210323-eng (DVB watermark)," Digital Video Broadcasting (DVB), C/O EBU-17A Ancienne Route—CH—1218 Grand Saconnex, Geneva—Switzerland, Mar. 24, 2021, 403 pages.

* cited by examiner

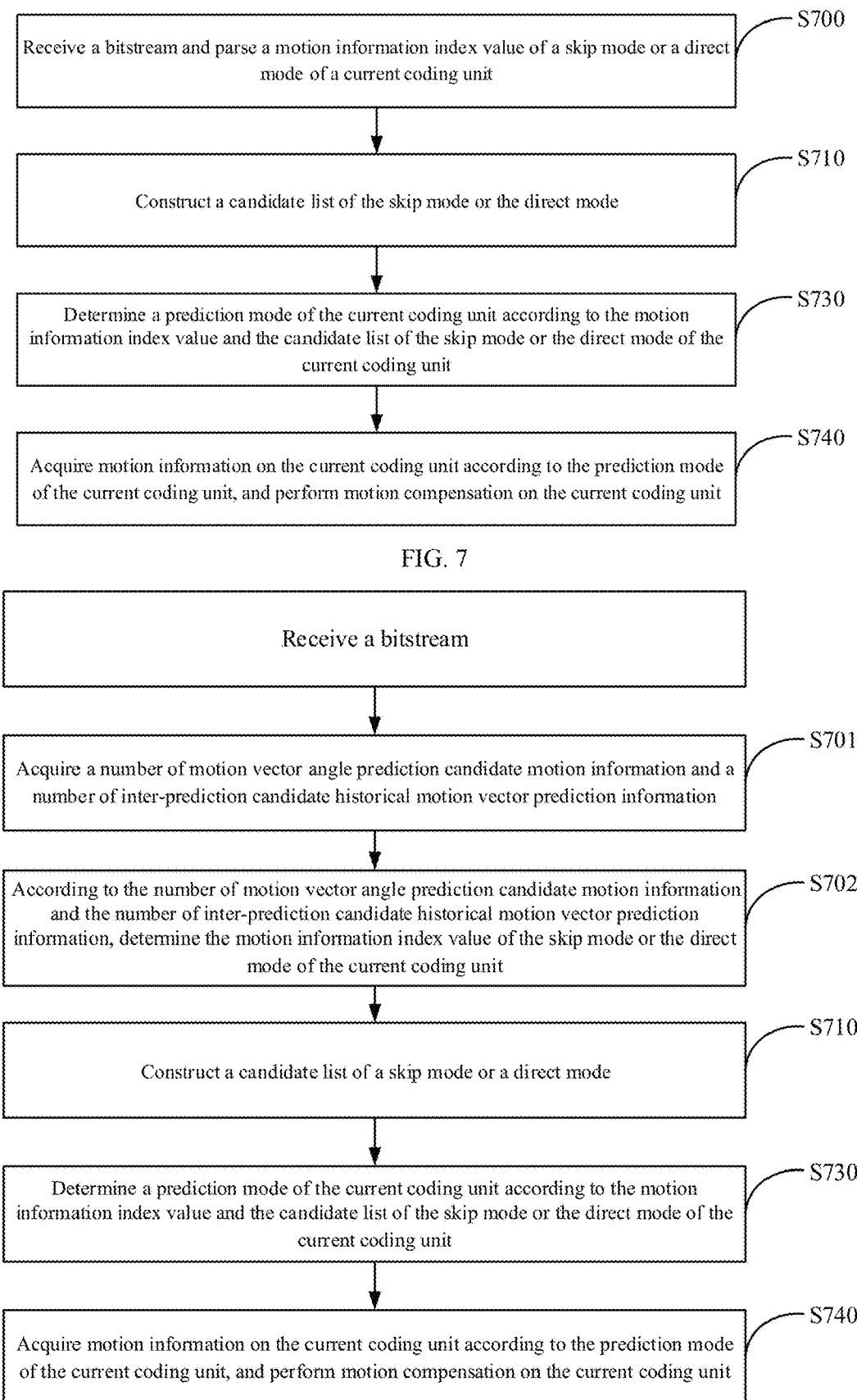

Receive a bitstream and parse a motion information index value of a skip mode or a direct mode of a current coding unit ⟋ S700

Construct a candidate list of the skip mode or the direct mode ⟋ S710

Determine a prediction mode of the current coding unit according to the motion information index value and the candidate list of the skip mode or the direct mode of the current coding unit ⟋ S730

Acquire motion information on the current coding unit according to the prediction mode of the current coding unit, and perform motion compensation on the current coding unit ⟋ S740

FIG. 7

Receive a bitstream

Acquire a number of motion vector angle prediction candidate motion information and a number of inter-prediction candidate historical motion vector prediction information ⟋ S701

According to the number of motion vector angle prediction candidate motion information and the number of inter-prediction candidate historical motion vector prediction information, determine the motion information index value of the skip mode or the direct mode of the current coding unit ⟋ S702

Construct a candidate list of a skip mode or a direct mode ⟋ S710

Determine a prediction mode of the current coding unit according to the motion information index value and the candidate list of the skip mode or the direct mode of the current coding unit ⟋ S730

Acquire motion information on the current coding unit according to the prediction mode of the current coding unit, and perform motion compensation on the current coding unit ⟋ S740

FIG. 8

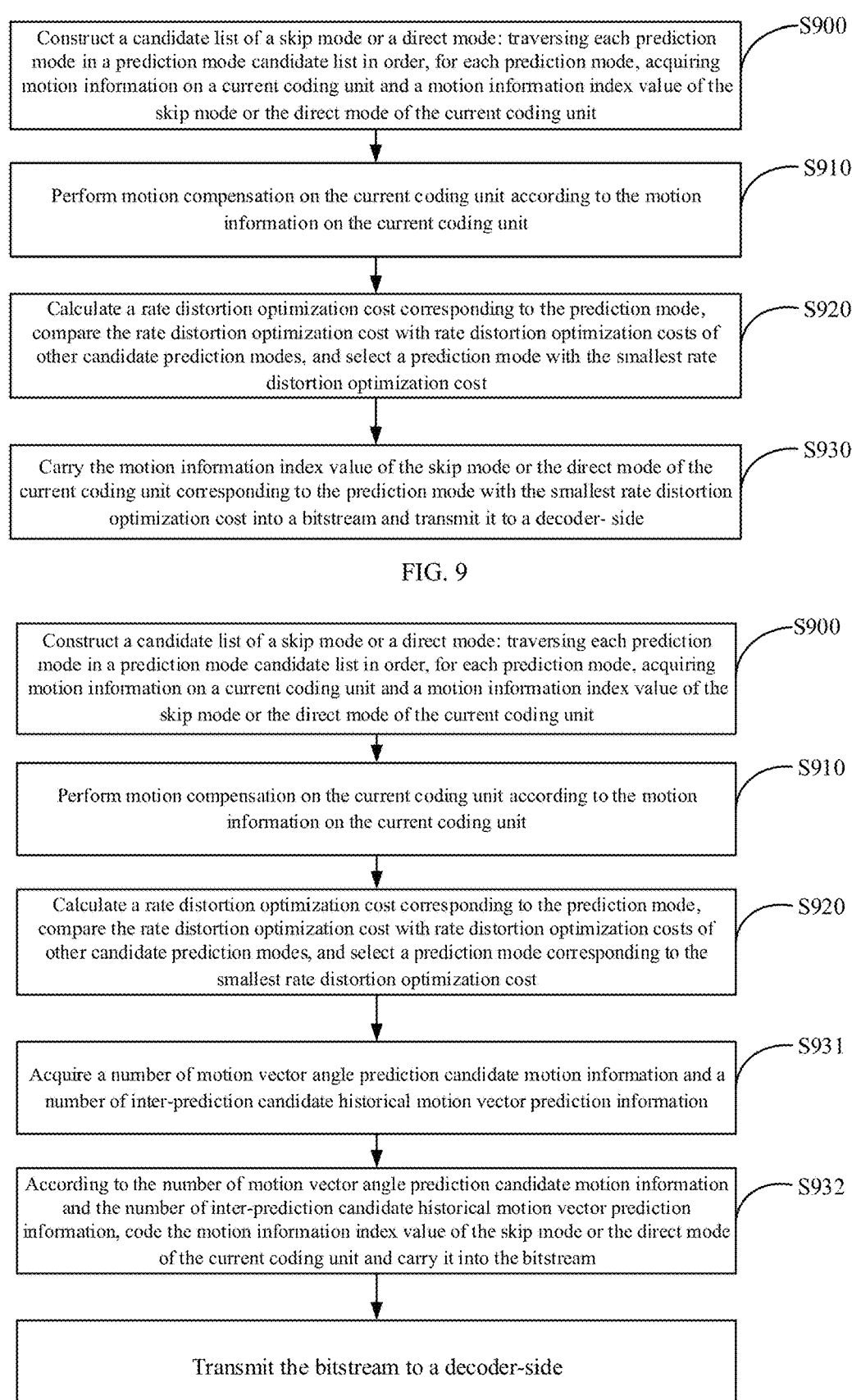

Construct a candidate list of a skip mode or a direct mode: traversing each prediction mode in a prediction mode candidate list in order, for each prediction mode, acquiring motion information on a current coding unit and a motion information index value of the skip mode or the direct mode of the current coding unit — S900

Perform motion compensation on the current coding unit according to the motion information on the current coding unit — S910

Calculate a rate distortion optimization cost corresponding to the prediction mode, compare the rate distortion optimization cost with rate distortion optimization costs of other candidate prediction modes, and select a prediction mode with the smallest rate distortion optimization cost — S920

Carry the motion information index value of the skip mode or the direct mode of the current coding unit corresponding to the prediction mode with the smallest rate distortion optimization cost into a bitstream and transmit it to a decoder- side — S930

FIG. 9

Construct a candidate list of a skip mode or a direct mode: traversing each prediction mode in a prediction mode candidate list in order, for each prediction mode, acquiring motion information on a current coding unit and a motion information index value of the skip mode or the direct mode of the current coding unit — S900

Perform motion compensation on the current coding unit according to the motion information on the current coding unit — S910

Calculate a rate distortion optimization cost corresponding to the prediction mode, compare the rate distortion optimization cost with rate distortion optimization costs of other candidate prediction modes, and select a prediction mode corresponding to the smallest rate distortion optimization cost — S920

Acquire a number of motion vector angle prediction candidate motion information and a number of inter-prediction candidate historical motion vector prediction information — S931

According to the number of motion vector angle prediction candidate motion information and the number of inter-prediction candidate historical motion vector prediction information, code the motion information index value of the skip mode or the direct mode of the current coding unit and carry it into the bitstream — S932

Transmit the bitstream to a decoder-side

FIG. 10

DECODING METHOD AND APPARATUS, CODING METHOD AND APPARATUS, DEVICE, AND STORAGE MEDIUM

CROSS-REFERENCE TO RELATED APPLICATION

The present application is a U.S. National Stage of International Application No. PCT/CN2022/097124, filed on Jun. 6, 2022, which claims the benefit of priority to Chinese Patent Application No. 202110739455.5, filed on Jun. 30, 2021, the contents of all of which are incorporated by reference herein in their entireties for all purposes.

TECHNICAL FIELD

The present disclosure relates to video coding and decoding technologies, and in particular to decoding methods and apparatuses, coding methods and apparatuses, devices and machine-readable storage media.

BACKGROUND

In general, a complete video coding may include operations such as prediction, transform, quantization, entropy coding, filtering and so on. The prediction may be divided into intra prediction and inter prediction. The intra prediction uses surrounding coded unit(s) as references to predict a current uncoded unit, so as to effectively reduce spatial redundancy. The inter prediction uses neighbouring coded picture(s) to predict a current picture, so as to effectively reduce temporal redundancy.

SUMMARY

In view of above, the present disclosure provides decoding methods and apparatuses, coding methods and apparatuses, devices and machine-readable storage media.

According to a first aspect of the embodiments of the present disclosure, a decoding method is provided, including: receiving a bitstream and parsing a motion information index value of a skip mode or a direct mode of a current coding unit; constructing a candidate list of the skip mode or the direct mode; determining a prediction mode of the current coding unit according to the motion information index value and the candidate list of the skip mode or the direct mode of the current coding unit; acquiring motion information of the current coding unit according to the prediction mode of the current coding unit; and performing motion compensation on the current coding unit; where the parsing the motion information index value of the skip mode or the direct mode of the current coding unit includes: acquiring a number of motion vector angle prediction candidate motion information and a number of inter-prediction candidate historical motion vector prediction information; and determining the motion information index value of the skip mode or the direct mode of the current coding unit according to the number of motion vector angle prediction candidate motion information and the number of inter-prediction candidate historical motion vector prediction information.

According to a second aspect of the embodiments of the present disclosure, a coding method is provided, including: constructing a candidate list of a skip mode or a direct mode: traversing each of prediction modes in a prediction mode candidate list in order, for each of the prediction modes, acquiring motion information of a current coding unit and a motion information index value of the skip mode or the direct mode of the current coding unit; performing motion compensation on the current coding unit according to the motion information of the current coding unit; calculating a rate distortion optimization cost corresponding to the prediction mode, comparing the rate distortion optimization cost with rate distortion optimization costs of other candidate prediction modes, and selecting a prediction mode with a smallest rate distortion optimization cost; carrying a motion information index value of the skip mode or the direct mode of the current coding unit corresponding to the prediction mode with the smallest rate distortion optimization cost into a bitstream and transmitting the bitstream to a decoder-side; where the carrying the motion information index value of the skip mode or the direct mode of the current coding unit corresponding to the prediction mode with the smallest rate distortion optimization cost into the bitstream includes: acquiring a number of motion vector angle prediction candidate motion information and a number of inter-prediction candidate historical motion vector prediction information; and coding the motion information index value of the skip mode or the direct mode of the current coding unit according to the number of motion vector angle prediction candidate motion information and the number of inter-prediction candidate historical motion vector prediction information and carrying the coded motion information index value into the bitstream.

According to a third aspect of the embodiments of the present disclosure, a decoding apparatus is provided, including: a decoding module, configured to receive a bitstream and parse a motion information index value of a skip mode or a direct mode of a current coding unit; a constructing module, configured to construct a candidate list of the skip mode or the direct mode; a determining module, configured to determine a prediction mode of the current coding unit according to the motion information index value and the candidate list of the skip mode or the direct mode of the current coding unit; a compensating module, configured to acquire motion information of the current coding unit according to the prediction mode of the current coding unit; and perform motion compensation on the current coding unit; where the decoding module is specifically configured to acquire a number of motion vector angle prediction candidate motion information and a number of inter-prediction candidate historical motion vector prediction information; and determine the motion information index value of the skip mode or the direct mode of the current coding unit according to the number of motion vector angle prediction candidate motion information and the number of inter-prediction candidate historical motion vector prediction information.

According to a fourth aspect of the embodiments of the present disclosure, a coding apparatus is provided, including: a constructing module, configured to construct a candidate list of a skip mode or a direct mode: traverse each of prediction modes in a prediction mode candidate list in order, for each of the prediction modes, acquire motion information of a current coding unit and a motion information index value of the skip mode or the direct mode of the current coding unit; a compensating module, configured to perform motion compensation on the current coding unit according to the motion information of the current coding unit; a determining module: configured to calculate a rate distortion optimization cost corresponding to the prediction mode, comparing the rate distortion optimization cost with rate distortion optimization costs of other candidate prediction modes, and select a prediction mode with a smallest rate distortion optimization cost; a coding module, configured to carry a motion information index value of the skip mode or the direct mode of the current coding unit corresponding to the prediction mode with the smallest rate distortion optimization cost into a bitstream and transmitting the bitstream to a decoder-side; where the coding module is specifically configured to acquire a number of motion vector angle prediction candidate motion information and a number of inter-prediction candidate historical motion vector prediction information; and code the motion information index value of the skip mode or the direct mode of the current coding unit according to the number of motion vector angle prediction candidate motion information and the number of inter-prediction candidate historical motion vector prediction information and carry the coded motion information index value into the bitstream.

According to a fifth aspect of the embodiments of the present disclosure, a decoder-side device is provided, including: a processor and a machine-readable storage medium, where the machine-readable storage medium stores machine-executable instructions executable by the processor, and the processor is configured to execute the machine-executable instructions to implement the decoding method according to the first aspect.

According to a sixth aspect of the embodiments of the present disclosure, a coder-side device is provided, including: a processor and a machine-readable storage medium, where the machine-readable storage medium stores machine-executable instructions executable by the processor, and the processor is configured to execute the machine-executable instructions to implement the coding method according to the second aspect.

According to a seventh aspect of the embodiments of the present disclosure, a non-transitory machine-readable storage medium is provided, which stores machine-executable instructions, where the machine-executable instructions are executed by a processor to implement the method according to the first aspect or second aspect.

In a decoding method of the embodiments of the present disclosure, by receiving a bitstream and parsing a motion information index value of a skip mode or a direct mode of a current coding unit, constructing a candidate list of the skip mode or the direct mode, determining a prediction mode of the current coding unit according to the motion information index value and the candidate list of the skip mode or the direct mode of the current coding unit, acquiring motion information of the current coding unit according to the prediction mode of the current coding unit, and performing motion compensation on the current coding unit, when parsing the motion information index value of the skip mode or the direct mode of the current coding unit, acquiring a number of motion vector angle prediction candidate motion information and a number of inter-prediction candidate historical motion vector prediction information; and determining the motion information index value of the skip mode or the direct mode of the current coding unit according to the number of motion vector angle prediction candidate motion information and the number of inter-prediction candidate historical motion vector prediction information. In this way, flexibility of determining the motion information index value of the skip mode or the direct mode is improved, and coding and decoding performance is improved.

BRIEF DESCRIPTION OF DRAWINGS

FIG. 7 is a schematic flowchart illustrating a decoding method according to an exemplary embodiment of the present disclosure;

FIG. 8 is a schematic flowchart illustrating another decoding method according to an exemplary embodiment of the present disclosure;

FIG. 9 is a schematic flowchart illustrating a coding method according to an exemplary embodiment of the present disclosure;

FIG. 10 is a schematic flowchart illustrating another coding method according to an exemplary embodiment of the present disclosure;

DETAILED DESCRIPTION

Figure 1A:
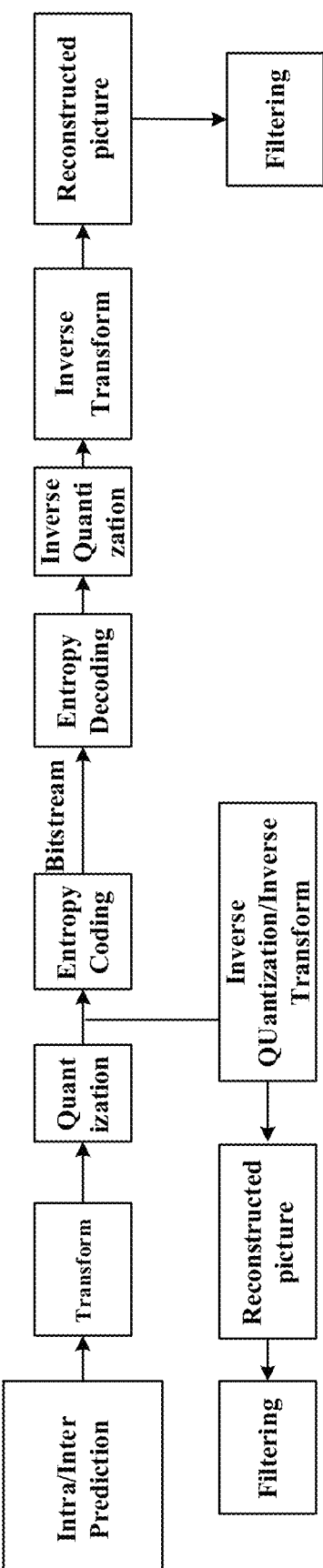
FIGS. 1a and 1b are schematic diagrams illustrating a coding and decoding method according to an exemplary embodiment of the present disclosure.

Embodiments will be described in detail here with the exemplary embodiments thereof expressed in the accompanying drawings. When the following description relates to the accompanying drawings, unless specified otherwise, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

The terms used in the present disclosure are merely for the purpose of describing specific embodiments, and are not intended to limit the present disclosure. The singular forms such as "a", 'an", "this" and "the" used in the present disclosure and the appended claims are also intended to include plurality, unless the context clearly indicates otherwise.

In order to make those skilled in the art to better understand technical solutions provided by the embodiments of the present disclosure, some technical terms involved in the embodiments of the present disclosure and main processes of available video coding and decoding are briefly described below.

In order to make those skilled in the art to better understand technical solutions provided by the embodiments of the present disclosure, some technical terms involved in the embodiments of the present disclosure are briefly described below first.

I. Technical Terms:

1. Inter Prediction: Inter Prediction refers to using a temporal correlation of a video. As a video sequence typically includes strong temporal correlation, using pixels of neighbouring coded picture(s) to predict pixels of a current picture can effectively reduce video temporal redundancy.

2. Prediction Pixel (or called Prediction Signal): refers to a pixel value derived from one or more coded/decoded pixels. A residual is obtained based on a difference between a raw pixel and a prediction pixel, and then a residual transform, quantization as well as coefficient coding are carried out.

In some examples, an inter prediction pixel refers to, for a current picture block, a pixel value derived from reference picture(s) (reconstructed picture), and since pixel locations are discrete, an interpolation operation may be required to obtain a final prediction pixel. The closer the prediction pixel is to the raw pixel, the smaller residual energy obtained by performing subtraction for both is, and the higher coding compression performance is.

3. Motion Vector (MV): in the inter prediction, the motion vector is for representing a relative displacement between a current coding block and a best matching block in a reference picture of the current coding block. Each of divided blocks (also called sub-blocks) has a corresponding motion vector to be transmitted to a decoder-side. If the motion vector of each sub-block is independently coded and transmitted, especially when it is divided into smaller-sized sub-blocks, quite a lot of bits have to be consumed. To reduce the number of bits for coding MVs, spatial correlation among adjacent blocks may be used to predict the MV of the current block to be coded based on the MV(s) of adjacent coded block(s), and then a prediction difference is coded. Thus, the number of bits representing the MVs can be effectively reduced. In this way, in a process of coding an MV of a current picture block, one or more MVs of an adjacent coded block are usually first used to predict the MV of the current picture block, and then a difference of between a Motion Vector Prediction (MVP) value and a real estimation value of the motion vector, namely Motion Vector Difference (MVD), is coded to effectively reduce the number of bits for coding the MVs.

4. Motion Information: since the MV represents a relative displacement between the current picture block and the best matching block in a reference picture, in order to accurately acquire information pointing to the picture block, in addition to MV, index information of a reference picture is further needed to indicate which reference picture is used. For a current picture, a reference picture list is usually established based on certain principles, and the index information of the reference picture indicates which reference picture listed in the reference picture list is used for the current picture block. In addition, many coding techniques further support multiple reference picture lists, so an index may also be needed to indicate which reference picture list is used, and the index may be called a reference direction. In the video coding, coding information related to motion, such as the MV, the reference picture index, and the reference direction, can be collectively referred to as motion information.

5. Skip mode: Skip mode refers to a skip mode in the inter prediction, in which the residual information or the MVD does not need to be transmitted, but only the index of motion information needs to be transmitted. The decoder-side may derive the motion information of a coding unit by parsing the index, and the predicted value may be directly used as a reconstructed value after acquiring the motion information.

6. Direct mode: Direct mode refers to a direct mode in the inter prediction, in which the residual information needs to be transmitted, but the MVD does not need to be transmitted, and the index of motion information needs to be transmitted. The decoder-side may derive the motion information of the coding unit by parsing the index, and the reconstructed value is obtained by adding the residual value to the predicted value after acquiring the motion information.

7. Binarization manner and inverse binarization manner of truncated unary code, a relationship between synElVal and binary symbol strings may be shown in Table 1:

TABLE 1

| synElVal | Binary symbol string | | | | | | | |
|---|---|---|---|---|---|---|---|---|
| 0 | 1 | | | | | | | |
| 1 | 0 | 1 | | | | | | |
| 2 | 0 | 0 | 1 | | | | | |
| 3 | 0 | 0 | 0 | 1 | | | | |
| 4 | 0 | 0 | 0 | 0 | 1 | | | |
| 5 | 0 | 0 | 0 | 0 | 0 | 1 | | |
| . . . | 0 | 0 | 0 | 0 | 0 | 0 | . . . | |
| maxVal-1 | 0 | 0 | 0 | 0 | 0 | 0 | . . . | 1 |
| maxVal | 0 | 0 | 0 | 0 | 0 | 0 | . . . | 0 |
| binIndex | 0 | 1 | 2 | 3 | 4 | 5 | . . . | maxVal-1 |

The coder-side may look up Table 1 to obtain binary symbol strings to be coded based on maxVal and the value synElVal to be coded. The decoder-side may uniquely obtain the value of synElVal by referring to Table 1 based on the binary symbol strings and maxVal.

8. Rate-Distortion Optimized (RDO) principle, indicators for evaluating coding efficiency include: a bit rate and a Peak Signal to Noise Ratio (PSNR). The smaller the bit rate, the greater a compression rate. The greater the PSNR, the better the quality of the reconstructed picture. When selecting a mode, a discriminant is essentially a comprehensive evaluation of the two.

A cost corresponding to a mode: $J(mode)=D+\lambda*R$, where D represents Distortion, usually measured by a Sum of Squared Errors (SSE). SSE refers to a mean sum of square of differences between a reconstructed block and a source picture block. $\lambda$ represents a Lagrangian multiplier. R represents an actual number of bits needed for coding a picture block in this mode, including a total number of bits needed for coding mode information, motion information, residuals and the like.

When selecting a mode, if the RDO principle is used to compare the coding modes, best coding performance can usually be guaranteed.

II. Main Processes of Video Coding and Decoding are Briefly Described Below.

Figure 1B:
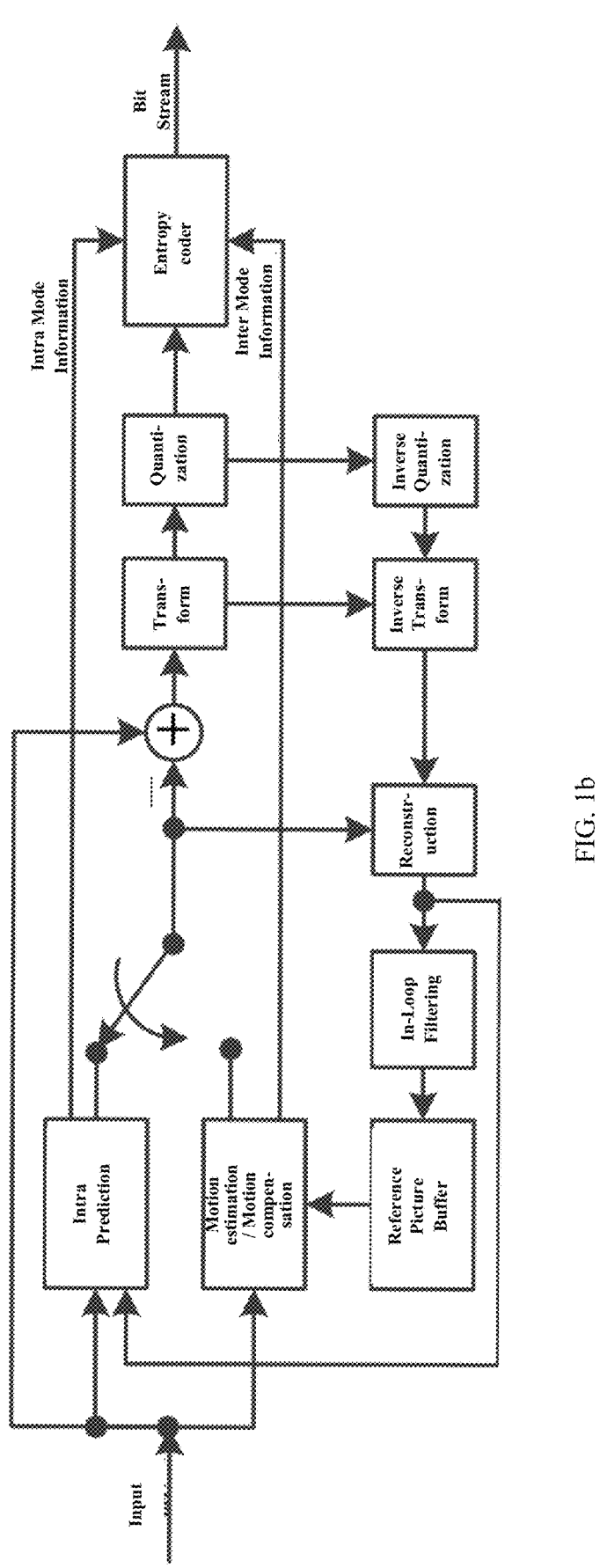

Please refer to FIG. 1a, taking video coding as an example, the video coding process may include processes such as prediction, transform, quantization, entropy coding and so on. Furthermore, the coding process may further be implemented according to a framework in FIG. 1b.

The prediction may be divided into intra prediction and inter prediction. The intra prediction refers to using surrounding coded block(s) as reference(s) to predict a current uncoded block, so as to effectively reduce spatial redundancy. The inter prediction refers to using neighbouring coded picture(s) to predict a current picture, so as to effectively reduce temporal redundancy.

The transform refers to transforming a picture from a spatial domain to a transform domain, and using transform coefficients to represent the picture. The vast majority of pictures contain many flat areas and slowly changing areas. Appropriate transformation may convert the picture from a scattered distribution in the spatial domain to a relatively concentrated distribution in the transform domain, remove a frequency domain correlation between signals, and cooperate with the quantization process to effectively compress the bitstream.

Entropy coding is a lossless coding manner that may convert a series of element symbols into a binary bitstream for transmission or storage. The input symbols may include quantized transform coefficients, motion vector information, prediction mode information, syntax related to transform and quantization, and the like. Entropy coding can effectively reduce redundancy of video element symbols.

The above is an introduction using coding as an example. The process of video decoding corresponds to the process of video coding, that is, video decoding usually includes processes such as entropy decoding, prediction, inverse quantization, inverse transform, filtering and so on, and the implementation principles of each process are the same or similar to video coding.

III. The following briefly describes the implementation of techniques such as the Temporal Motion Vector Prediction (TMVP) mode/Sub-Block Temporal Motion Vector Prediction (SBTMVP), MHBSKIP, Motion Vector Angle Prediction (MVAP), History-based Motion Vector Prediction (HMVP) and Enhanced Temporal Motion Vector Prediction (ETMVP).

3.1 TMVP/SBTMVP

In AVS3, techniques TMVP and SBTMVP have been adopted into standards at present. If width and height of a current block are both greater than or equal to 16, temporal motion information of the current block is motion information generated by SBTMVP; otherwise, the temporal motion information of the current block is motion information generated by TMVP.

TMVP: first, the motion information in a temporal reference picture at an identical location to a preset location of a current coding unit is found, and then the motion information after scaling is used as temporal motion information of the current block. For a P picture, the temporal reference picture is the first picture in list0. For a B picture, the temporal reference picture is the first picture in list1.

Figure 2:
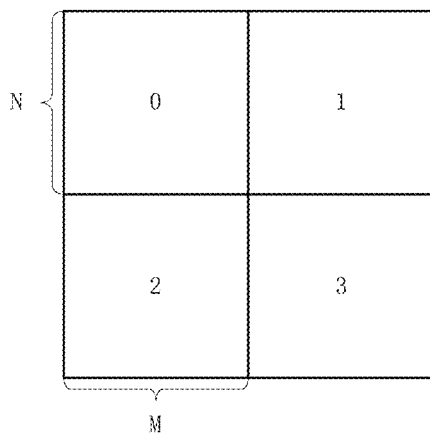
FIG. 2 is a schematic diagram illustrating a partitioning of block in a SBTMVP mode according to an exemplary embodiment of the present disclosure.

SBTMVP: assuming that a size of the current block is 2M×2N, a schematic diagram as shown in FIG. 2, an area in the temporal reference picture with an identical location to the current coding unit is found, and then the area is divided into 4 sub-blocks of size M×N. Motion information of each sub-block at corresponding locations of the temporal reference picture is obtained, and after scaling, the motion information is used as motion information of sub-blocks at corresponding locations of the current block, and finally motion compensation is performed on the motion information of each sub-block to obtain prediction values.

3.2 MHBSKIP

MHBSKIP is a prediction mode in Skip and Direct modes in AVS, which uses motion information of adjacent blocks in a spatial domain of a current coding unit to predict the motion information of the current coding unit.

The MHBSKIP mode constructs bidirectional, backward and forward motion information based on the adjacent blocks in the spatial domain of the current coding unit to perform a prediction on the current coding unit.

Figure 3:
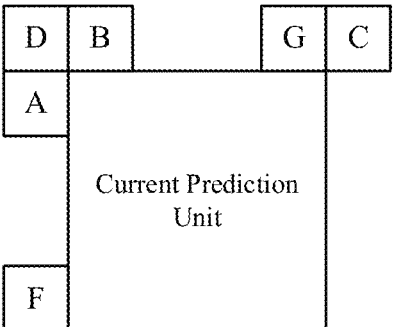
FIG. 3 is a schematic diagram illustrating locations of adjacent blocks in a spatial domain of Skip and Direct modes according to an exemplary embodiment of the present disclosure.

In some examples, the locations of adjacent blocks in the spatial domain of the Skip and Direct modes may be as shown in FIG. 3.

3.3 MVAP

In AVS3, the MVAP technique has been adopted into standards. The MVAP technique refers to dividing a current coding unit into sub-blocks, and then using up to 5 kinds of prediction angles to copy motion information from adjacent blocks in surrounding spatial domain for each sub-block according to preset angles. In this way, more motion information can be provided inside the current coding unit without dividing the coding unit, so as to improve coding performance.

Figure 4:
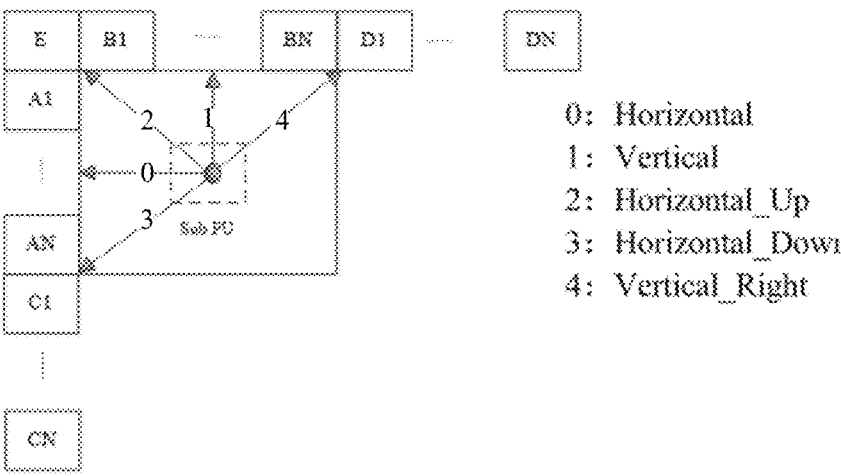
FIG. 4 is a schematic diagram illustrating a corresponding relationship between mode indexes and modes in an MVAP mode according to an exemplary embodiment of the present disclosure.

In some examples, in the MVAP technique, corresponding relationships between mode indexes and modes can be referred to Table 2 and FIG. 4.

TABLE 2

| Mode Index | Mode Description |
|---|---|
| 0 | Horizontal |
| 1 | Vertical |
| 2 | Horizontal_Up |
| 3 | Horizontal_Down |
| 4 | Vertical_Right |

Specific steps are as follows.

At step 3.3.1, valid motion vector angle prediction mode number (ValidMvapModeNum) is derived.

Let W and H be width and height of a current decoding unit, m and n be W/4 and H/4 respectively, and (x, y) be pixel coordinates of an upper-left corner of a current decoding unit. A0, A1, . . . , Am−1 are 4×4 blocks at locations of a lower-left corner of the current block; Am, Am+1, . . . , Am+n−1 are 4×4 blocks at locations beside left of the current block, Am+n is a 4×4 block at a location of the upper-left corner of the current block, Am+n+1, Am+n+2, . . . , A2m+n are 4×4 blocks at locations above the current block, and A2m+n+1, A2m+n+1, . . . , A2m+2n are 4×4 blocks at locations of an upper-right corner of the current block.

Figure 5:
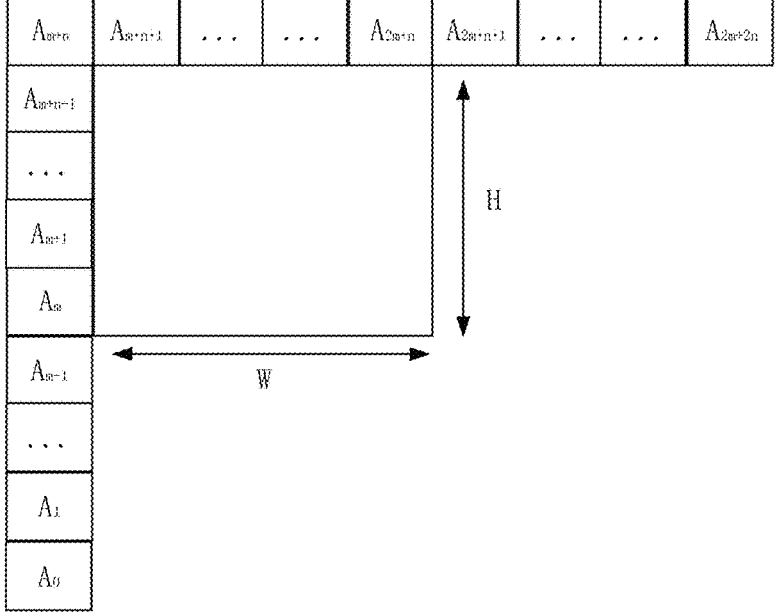
FIG. 5 is a schematic diagram illustrating a location of a motion vector angle prediction sample according to an exemplary embodiment of the present disclosure.

In some examples, a schematic diagram of a location of a motion vector angle prediction sample may be shown in FIG. 5.

In some examples, if a value range of i is from 0 to m+n, coordinates of Ai are (x−1, y+H+W−4×i−1). If the value range of i is from m+n+1 to 2m+2n, the coordinates of Ai are (x+4×i−W−H−1, y−1).

ValidMvapModeNum and ValidMvapModeFlag[s] (s=0~4) are derived based on following steps.

At step 3.3.1.1, ValidMvapModeNum is initialized to 0, and ValidMvapModeFlag[s] is initialized to 0 (s=0~4).

At step 3.3.1.2, if one of the following conditions is met, ValidMvapModeNum is equal to 0, and ValidMvapModeFlag[s] is equal to 0 (s=0~4).

3.3.1.2.1, a value of EtmvpMvapEnableFlag is 0.

3.3.1.2.2, W is less than 8, or His less than 8, or both W and H are equal to 8.

At step 3.3.1.3, otherwise, values of ValidMvapMod-eNum and ValidMvapModeFlag[s] are updated as follows.

At step 3.3.1.3.1, if Am−1+H/8 and Am+n−1 blocks both use the inter prediction mode and the motion information of them is different, ValidMvapModeFlag[0] is equal to 1, and the value of ValidMvapModeNum is increased by 1.

At step 3.3.1.3.2, if Am+n+1+W/8 and Am+n+1 blocks both use the inter prediction mode and the motion information of them is different, ValidMvapModeFlag[1] is equal to 1, and the value of ValidMvapModeNum is increased by 1.

At step 3.3.1.3.3, if Am+n−1 and Am+n blocks both use the inter prediction mode and the motion information of them is different, or if Am+n and Am+n+1 blocks both use the inter prediction mode and the motion information of them is different, ValidMvapModeFlag[2] is equal to 1, and the value of ValidMvapModeNum is increased by 1.

At step 3.3.1.3.4, if AW/8−1 and Am−1 blocks both use the inter prediction mode and the motion information of them is different, or if Am−1 and Am−1+H/8 blocks both use the inter prediction mode and the motion information of them is different, ValidMvapModeFlag[3] is equal to 1, and the value of ValidMvapModeNum is increased by 1.

At step 3.3.1.3.5, if Am+n+1+W/8 and A2m+n+1 blocks both use the inter prediction mode and the motion information of them is different, or if A2m+n+1 and A2m+n+1+H/8 blocks both use the inter prediction mode and the motion information of them is different, ValidMvapModeFlag[4] is equal to 1, and the value of ValidMvapModeNum is increased by 1.

At step 3.3.2, a reference motion information list neigh-borMotions[i] (i=0~2m+2n) is filled.

Let neighborMotions[i] be an i-th motion information (interPredRefMode, mvE0, mvE1, refIndexL0, refIndexL1) in the reference motion information list, where the value range of i is 0~2m+2n.

If motion information of a storage unit in a spatial domain at location Ai is "available", the motion information of the storage unit at location Ai is recorded as motionInfoAi (i=0~2m+2n).

At step 3.3.2.1, neighborMotions[0] is filled.

At step 3.3.2.1.1, if motion information of a storage unit in a spatial domain at location A0 is "unavailable", a prediction reference mode interPredRefMode of neighbor-Motions[0] is set to "PRED_List0", mvE0 of neighborMo-tions[0] is set to zero vector, and refIndexL0 of neighbor-Motions[0] is set to 0;

At step 3.3.2.1.2, otherwise, neighborMotions[0] is set to motionInfoA0.

At step 3.3.2.2, Ai is sequentially traversed from small to large to fill neighborMotions[i] based on the following steps.

At step 3.3.2.2.1, if the motion information of the storage unit in the spatial domain at location Ai is "available", neighborMotions[i] is motionInfoAi.

At step 3.3.2.2.2, otherwise, neighborMotions[i] is equal to neighborMotions[i−1].

At step 3.3.3, a motion information array MotionArray is derived.

The motion information array MotionArray[i][j] (inter-PredRefMode, MvE0, MvE1, fIndexL0, RefIndexL1) of sub-blocks within the current coding unit is determined according to curMvapMode and neighborMotions, where i=0~(W>>3)−1, j=0~(H>>3)−1, (i, j) is an index of 8×8 sub-blocks in the current coding unit, i is a horizontal index value of a sub-block, and j is a vertical index value of the sub-block. Each sub-block is traversed to derive a sub-block motion information array MotionArray for motion vector angle prediction, and BgcFlag and BgcIndex are set to zero.

```
m=W>>2
n=H>>2
if (curMvapMode==0) {
    MotionArray[i][j]=neighborMotions[m+n−1−(j<<1)]
}
else if (curMvapMode==1) {
    MotionArray[i][j]=neighborMotions[m+n+1+(i<<1)]
}
else if (curMvapMode==2) {
    MotionArray[i][j]=neighborMotions[m+n−(j<<1)+(i<<1)]
}
else if (curMvapMode==3) {
    MotionArray[i][j]=neighborMotions[m+n−(j<<1)−(i<<1)−3]
}
else if (curMvapMode==4) {
    MotionArray[i][j]=neighborMotions[m+n+(j<<1)+(i<<1)+3]
}
```

3.4 HMVP

History-based motion vector prediction method is a tech-nique adopted in a new generation video coding standard AVS3, and a principle of the HMVP is to use motion information of one or more previous coding blocks to predict motion information of a current coding unit. The motion information of the one or more previous coding units is saved by constructing an HMVP Table, and when a block is decoded, the HMVP Table is updated. Therefore, for the current coding unit, the motion information in the HMVP Table is always available, which improves prediction accu-racy.

Figure 6:
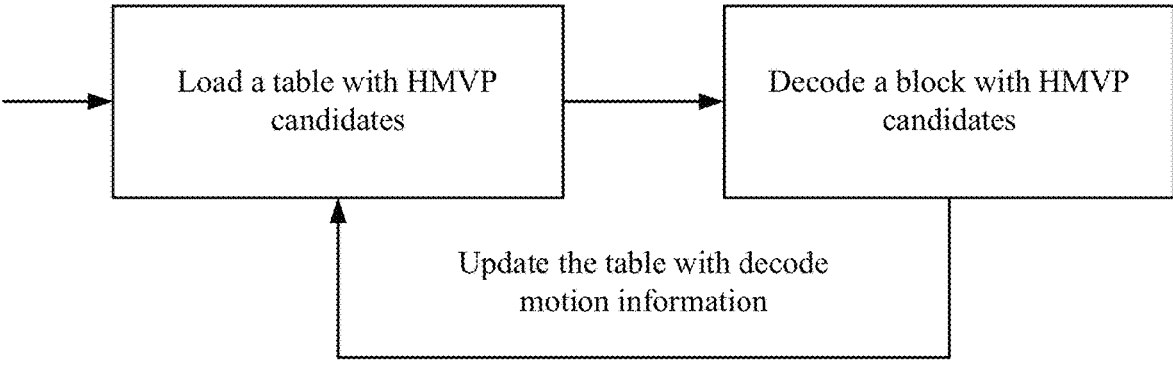
FIG. 6 is a decoding flowchart illustrating an HMVP method according to an exemplary embodiment of the present disclosure.

In some examples, a decoding flowchart of the HMVP method may be shown in FIG. 6.

3.5 ETMVP

In AVS3, ETMVP technique has been adopted into stan-dards. First, an area in a temporal reference picture at an identical location to a current coding unit is found, and then a motion vector scaling value in a temporal motion infor-mation storage unit where each 8×8 block in the area is located is used as a first candidate; then the area is shifted by 8 luminance samples left, right, up, and down, as subsequent candidates. After each candidate is obtained, the candidates have to be checked for a duplicate, and then be put into a candidate motion vector list, where for a P picture, the temporal reference picture is the first picture of list0, and for a B picture, the temporal reference picture is the first picture of list1. Finally, for each candidate in the list, motion information of 8×8 sub-block is obtained to perform motion compensation to obtain a prediction value.

In related arts, an order of constructing the list in skip/direct mode is: temporal+MHBSKIP+MVAP+HMVP, which means constructing a candidate list of skip/direct mode in the order of temporal (time domain), MHBSKIP, MVAP, and HMVP.

If a current picture is a P picture, one piece of candidate motion information may be generated by the temporal, one piece of candidate motion information may be generated by MHBSKIP, and a total of eight pieces of candidate motion information may be generated by MVAP and HMVP, in this way, a length of the list is 1+1+8=10.

If a current picture is a B picture, one piece of candidate motion information may be generated by the temporal, three pieces of candidate motion information may be generated by MHBSKIP, and a total of eight pieces of candidate motion information may be generated by MVAP and HMVP, in this way, the length of the list is 1+3+8=12.

MVAP and HMVP may generate a total of eight pieces of candidate motion information. For example, MVAP may generate ValidMvapModeNum piece(s) of candidate motion information, and HMVP may generate remaining (8-ValidMvapModeNum) piece(s) of candidate motion information, where ValidMvapModeNum ranges from 0 to 5.

In order to represent each different candidate motion information, a motion information index value cu_subtype_index of the skip mode or direct mode of the current coding unit is to be used for identification. Currently, a value range of cu_subtype_index is 0 to 11, and binarization coding is performed by using truncated unary code, with maxVal is equal to 11.

However, in practice, since the P picture and the B picture may generate candidate lists with different lengths, and maximum numbers of candidate motion information allowed to be generated by HMVP and MVAP are not fixed, the value range of cu_subtype_index is also not fixed. If maxVal being equal to 11 is fixedly used for coding cu_subtype_index, it may cause redundancy in the bit overhead.

In order to improve flexibility of determining an index value, reduce coding redundancy and improve coding and decoding performance, optimization solutions of embodiments of the present disclosure may include some or all of the following.

First, high-level syntax is acquired, a number of motion vector angle prediction candidate motion information (NumOfMvapCand) and the number of inter-prediction candidate historical motion vector prediction information (NumOfHmvpCand) are acquired, and a picture type of a current picture is acquired.

Then, the motion information index value cu_subtype_index of the skip mode or the direct mode of the current coding unit is parsed according to the picture type of the current picture, NumOfMvapCand, and NumOfHmvpCand.

Finally, ValidMvapModeNum is acquired, and whether a current coding unit type is MVAP mode or HMVP mode is determined according to cu_subtype_index and ValidMvapModeNum.

In order to make the above purposes, features and advantages of the embodiments of the present disclosure more legible and understandable, technical solutions in the embodiments of the present disclosure will be further described in detail below in combination with the accompanying drawings.

Referring to FIG. 7, which is a schematic flowchart illustrating a decoding method according to an embodiment of the present disclosure, the decoding method may be performed by a decoder-side device. As shown in FIG. 7, the decoding method may include the following steps.

At step S700, a bitstream is received and a motion information index value of a skip mode or a direct mode of a current coding unit is parsed.

At step S710, a candidate list of the skip mode or the direct mode is constructed.

At step S720, a prediction mode of the current coding unit is determined according to the motion information index value and the candidate list of the skip mode or the direct mode of the current coding unit.

At step S730, motion information of the current coding unit is acquired according to the prediction mode of the current coding unit, and motion compensation is performed on the current coding unit.

As shown in FIG. 8, in step S700, parsing the motion information index value of the skip mode or the direct mode of the current coding unit may be implemented through the following steps.

At step S701, a number of motion vector angle prediction candidate motion information and a number of inter-prediction candidate historical motion vector prediction information are acquired.

At step S702, according to the number of motion vector angle prediction candidate motion information and the number of inter-prediction candidate historical motion vector prediction information, the motion information index value of the skip mode or the direct mode of the current coding unit is determined.

In embodiments of the present disclosure, considering that maximum numbers of candidate motion information allowed to be generated by HMVP and MVAP are not fixed, and considering that a value range of the motion information index value of the skip mode or the direct mode is also not fixed, in order to improve flexibility of determining the motion information index value of the skip mode or the direct mode, a maximum index value (e.g., maxVal) is no longer fixed at 11, but may be determined according to the number of motion vector angle prediction candidate motion information and the number of inter-prediction candidate historical motion vector prediction information.

In some examples, when the decoder-side device receives the bitstream, the number of motion vector angle prediction candidate motion information (i.e., NumOfMvapCand) and the number of inter-prediction candidate historical motion vector prediction information (i.e., NumOfHmvpCand) may be acquired.

In some embodiments, the decoder-side device may acquire the number of motion vector angle prediction candidate motion information and the number of inter-prediction candidate historical motion vector prediction information by parsing sequence-level high-level syntax.

When the decoder-side device acquires the number of motion vector angle prediction candidate motion information and the number of inter-prediction candidate historical motion vector prediction information, it may determine the motion information index value of the skip mode or the direct mode of the current coding unit according to the acquired number of motion vector angle prediction candidate motion information and number of inter-prediction candidate historical motion vector prediction information.

In an example, acquiring the number of motion vector angle prediction candidate motion information and the number of inter-prediction candidate historical motion vector prediction information by parsing the sequence-level high-level syntax may include: parsing an enhanced temporal motion vector prediction and motion vector angle prediction enable flag; determining the number of motion vector angle prediction candidate motion information according to a value of the enhanced temporal motion vector prediction and motion vector angle prediction enable flag, parsing an index of the number of inter-prediction candidate historical motion vector prediction information; and determining the number of inter-prediction candidate historical motion vector prediction information according to a value of the index of the number of inter-prediction candidate historical motion vector prediction information.

In some examples, via the sequence-level high-level syntax, the number of motion vector angle prediction candidate motion information and the number of inter-prediction candidate historical motion vector prediction information may be determined by using the enhanced temporal motion vector prediction and motion vector angle prediction enable flag (etmvp_mvap_enable_flag) and the index of the number of inter-prediction candidate historical motion vector prediction information (num_of_hmvp_cand).

In some examples, the enhanced temporal motion vector prediction and motion vector angle prediction enable flag is used to indicate that an enhanced temporal motion vector prediction mode and a motion vector angle prediction mode are enabled simultaneously, or to indicate that the enhanced temporal motion vector prediction mode and the motion vector angle prediction mode are disabled simultaneously.

In some examples, a value range of etmvp_mvap_enable_flag is from 0 to 1, and a value range of num_of_hmvp_cand is from 0 to 8.

In some examples, the decoder-side device may determine NumOfMvapCand by parsing the value of etmvp_mvap_enable_flag, and determine NumOfHmvpCand by parsing the value of num_of_hmvp_cand.

For example, the decoder-side device may determine NumOfMvapCand according to the value of etmvp_mvap_enable_flag by following manner:

$$\text{the value of NumOfMvapCand is etmvp\_mvap\_enable\_flag}==1?5:0$$

where, when the value of etmvp_mvap_enable_flag is 1, the value of NumOfMvapCand is 5; when the value of etmvp_mvap_enable_flag is not 1, the value of NumOfMvapCand is 0.

That is, when the value of the enhanced temporal motion vector prediction and motion vector angle prediction enable flag is 1, it is determined that the number of motion vector angle prediction candidate motion information is 5, where the value of the enhanced temporal motion vector prediction and motion vector angle prediction enable flag being 1 indicates that the current coding unit can use enhanced temporal motion vector prediction and motion vector angle prediction, that is, the current coding unit enables the enhanced temporal motion vector prediction and the motion vector angle prediction at the same time.

When the value of the enhanced temporal motion vector prediction and motion vector angle prediction enable flag is 0, it is determined that the number of motion vector angle prediction candidate motion information is 0, where the value of the enhanced temporal motion vector prediction and motion vector angle prediction enable flag being 0, or the enhanced temporal motion vector prediction and motion vector angle prediction enable flag not carrying in the bitstream, indicates that the current coding unit should not use the enhanced temporal motion vector prediction and the motion vector angle prediction, that is, the current coding unit disables the enhanced temporal motion vector prediction and the motion vector angle prediction at the same time.

In some examples, the decoder-side device may use the value of num_of_hmvp_cand as NumOfHmvpCand.

In an example, determining the motion information index value of the skip mode or the direct mode of the current coding unit according to the number of motion vector angle prediction candidate motion information and the number of inter-prediction candidate historical motion vector prediction information may include: determining a maximum index value according to the number of motion vector angle prediction candidate motion information and the number of inter-prediction candidate historical motion vector prediction information; and parsing the motion information index value of the skip mode or the direct mode of the current coding unit by using an inverse binarization manner of the truncated unary code according to the maximum index value.

In some examples, when NumOfMvapCand and NumOfHmvpCand are determined according to the above manner, the decoder-side device may determine the maximum index value (e.g., maxVal) according to the determined NumOfMvapCand and NumOfHmvpCand, and according to the maxVal, parse the motion information index value of the skip mode or the direct mode of the current coding unit by using the inverse binarization manner of the truncated unary code. In some examples, maxVal determined according to the determined NumOfMvapCand and NumOfHmvpCand is less than or equal to 11.

As an example, determining the maximum index value according to the number of motion vector angle prediction candidate motion information and the number of inter-prediction candidate historical motion vector prediction information may include: determining a maximum value of the number of motion vector angle prediction candidate motion information and the number of inter-prediction candidate historical motion vector prediction information; and determining a sum of the maximum value and 3 (three) as the maximum index value. In some examples, considering that a maximum number of temporal candidate motion information and candidate motion information of MHB-SKIP is 4, and the value of maxVal is (list length−1), maxVal can be determined according to the sum of 3 and the maximum value of NumOfMvapCand and NumOfHmvpCand.

In some examples, the decoder-side device may determine maxVal in the following manner:

$$\text{maxVal}=(3+\text{Max}(\text{NumOfMvapCand}, \text{NumOfHmvpCand}))$$

Since $\text{Max}(\text{NumOfMvapCand}, \text{NumOfHmvpCand}) \leq 8$, the maxVal determined as above is less than or equal to 11. According to this maxVal, when the motion information index value of skip mode or direct mode is coded by using binarization manner of the truncated unary code, a number of bits required may be less than or equal to a number of bits required in a case of maxVal=11. Therefore, using the methods provided by the embodiments of the present disclosure may reduce the number of bits required for coding the motion information index value of the skip mode or the direct mode with a high probability, reduce coding and decoding overhead, and improve coding and decoding performance.

In some embodiments, determining the motion information index value of the skip mode or the direct mode of the current coding unit according to the number of motion vector angle prediction candidate motion information and the number of inter-prediction candidate historical motion vector prediction information in Step S702 may include: according to the number of motion vector angle prediction candidate motion information, the number of inter-prediction candidate historical motion vector prediction information, and a picture type of a current picture, determining the motion information index value of the skip mode or the direct mode of the current coding unit.

In some examples, considering that numbers of candidate motion information of MHBSKIP corresponding to different picture types may be different, for example, for a P picture, the number of candidate motion information of MHBSKIP is 1; and for a B picture, the number of candidate motion information of MHBSKIP is 3. Therefore, in order to improve flexibility of determining the motion information index value of the skip mode or the direct mode, a picture type may further be considered when determining the motion information index value of the skip mode or the direct mode. That is, the decoder-side device may determine the motion information index value of the skip mode or the direct mode of the current coding unit according to the number of motion vector angle prediction candidate motion information and the number of inter-prediction candidate historical motion vector prediction information, as well as the picture type of the current picture.

In an example, determining the motion information index value of the skip mode or the direct mode of the current coding unit according to the number of motion vector angle prediction candidate motion information, the number of inter-prediction candidate historical motion vector prediction information, and the picture type of the current picture may include: determining a maximum index value according to the number of motion vector angle prediction candidate motion information, the number of inter-prediction candidate historical motion vector prediction information, and the picture type of the current picture; and parsing the motion information index value of the skip mode or the direct mode of the current coding unit by using the inverse binarization manner of the truncated unary code according to the maximum index value.

In some examples, in addition to acquiring NumOfMvapCand and NumOfHmvpCand in the manners described in the above embodiments, the decoder-side device may also acquire a picture type of a video picture (referred to as the current picture in the present disclosure) to which the current coding unit belongs. In some examples, the picture type may include, but is not limited to, B picture or P picture.

In some examples, the decoder-side device may determine the maximum index value according to the number of motion vector angle prediction candidate motion information, the number of inter-prediction candidate historical motion vector prediction information, and the picture type of the current picture.

As an example, determining the maximum index value according to the number of motion vector angle prediction candidate motion information, the number of inter-prediction candidate historical motion vector prediction information, and the picture type of the current picture may include: determining a maximum value of the number of motion vector angle prediction candidate motion information and the number of inter-prediction candidate historical motion vector prediction information; if the picture type of the current picture is the P picture, a sum of the maximum value and 1 (one) is determined as the maximum index value; and if the picture type of the current picture is the B picture, a sum of the maximum value and 3 is determined as the maximum index value.

In some examples, for the P picture, the number of candidate motion information of MHBSKIP is 1; and for the B picture, the number of candidate motion information of MHBSKIP is 3. Therefore, when the picture type of the current picture is the P picture, a sum of 1 and the maximum value of NumOfMvapCand and NumOfHmvpCand may be determined as maxVal. When the picture type of the current picture is the B picture, a sum of 3 and the maximum value of NumOfMvapCand and NumOfHmvpCand may be determined as maxVal.

Since the number of candidate motion information of MHBSKIP takes a value of 1 for a case where the picture type is the P picture, compared with an implementation in which the number of candidate motion information of MHBSKIP is directly set to 3 regardless of the picture type, a determined value of maxVal may be reduced. Therefore, a bit overhead for coding the motion information index value of the skip mode or the direct mode by using the binarization manner of truncated unary code may be reduced, and the coding and decoding performance may be improved.

In some examples, when the decoder-side device determines maxVal according to the above manner, a motion information index value of the skip mode or the direct mode of the current coding unit may be parsed by using an inverse binarization manner of truncated unary code according to the determined maxVal. In some examples, for a corresponding relationship between maxVal and the motion information index value of the skip mode or the direct mode, please refer to relevant information recorded in Table 1.

In some embodiments, determining the prediction mode of the current coding unit according to the motion information index value and candidate list of the skip mode or the direct mode of the current coding unit in step S720 may include: determining the prediction mode of the current coding unit according to a valid motion vector angle prediction mode number and the motion information index value of the skip mode or the direct mode.

In some examples, when the decoder-side device determines a motion information index value of the skip mode or direct mode of the current coding unit according to the above manner, the prediction mode of the current coding unit may be determined according to the valid motion vector angle prediction mode number (ValidMvapModeNum) and the motion information index value of the skip mode or the direct mode.

In an example, determining the prediction mode of the current coding unit according to the valid motion vector angle prediction mode number and the motion information index value of the skip mode or the direct mode may include: if a motion information index value of the skip mode or the direct mode is greater than or equal to N, when the valid motion vector angle prediction mode number is greater than 0 and the motion information index value of the skip mode or the direct mode is less than a sum of N and the valid motion vector angle prediction mode number, determining that the prediction mode of the current coding unit is a motion vector angle prediction mode; and when the valid motion vector angle prediction mode number is equal to 0 or the motion information index value of the skip mode or the direct mode is greater than or equal to the sum of N and the valid motion vector angle prediction mode number, determining that the prediction mode of the current coding unit is a history-based motion vector prediction mode.

In some examples, when the decoder-side device determines a motion information index value of the skip mode or the direct mode according to the above manner, it may determine whether the motion information index value of the skip mode or the direct mode is greater than N. In some examples, N may be a positive integer.

In some examples, N may be a sum of temporal candidate motion information in a candidate list and candidate motion information generated by MHBSKIP. In some examples, a value of N can be determined according to a picture type of a current picture.

As an example, if the picture type of the current picture is a P picture, N=2; and if the picture type of the current picture is a B picture, N=4.

In some examples, when the decoder-side device determines that the motion information index value of the skip mode or the direct mode is greater than or equal to N, the decoder-side device may further determine whether ValidMvapModeNum is greater than 0, and determine whether the motion information index value of the skip mode or the direct mode is less than the sum of N and ValidMvapModeNum.

When ValidMvapModeNum is greater than 0, and the motion information index value of the skip mode or the direct mode is less than the sum of N and ValidMvapModeNum, which means that the motion vector angle prediction mode generates candidate motion information and candidate motion information corresponding to the motion information index value of the skip mode or the direct mode points to the candidate motion information generated by the motion vector angle prediction mode, the decoder-side device may determine that the prediction mode of the current coding unit is the motion vector angle prediction mode.

When ValidMvapModeNum is equal to 0, or the motion information index value of the skip mode or the direct mode is greater than or equal to the sum of N and the valid motion vector angle prediction mode number, which means that the motion vector angle prediction mode does not generate candidate motion information, or the candidate motion information corresponding to the motion information index value of the skip mode or the direct mode points to candidate motion information generated by the history-based motion vector prediction mode, the decoder-side device may determine that the prediction mode of the current coding unit is the history-based motion vector prediction mode.

In some embodiments, after the above determination of a prediction mode of a current coding unit, the method may further include: when the prediction mode of the current coding unit is the history-based motion vector prediction mode, if the current coding unit is an inter prediction unit and is not an affine prediction unit and is not an angle weighted prediction unit and is not an enhanced temporal motion vector prediction unit and is not a motion vector angle prediction unit and is not a subblock-based temporal motion information prediction unit, and if the number of inter-prediction candidate historical motion vector prediction information is greater than 0, a historical motion vector prediction information list is updated; otherwise, the historical motion vector prediction information list is not updated.

In some examples, when the decoder-side device determines that the prediction mode of the current coding unit is the history-based motion vector prediction mode according to a manner described in the above embodiments, the decoder-side device may determine whether the current coding unit meets following conditions: the current coding unit is an inter prediction unit, the current coding unit is not an affine prediction unit, the current coding unit is not an angle weighted prediction unit, the current coding unit is not an enhanced temporal motion vector prediction unit, the current coding unit is not a motion vector angle prediction unit, the current coding unit is not a subblock-based temporal motion information prediction unit, and the number of inter-prediction candidate historical motion vector prediction information (i.e., NumOfHmvpCand) is greater than 0.

When the decoder-side device determines that the current coding unit meets all the above conditions, the decoder-side device may update the historical motion vector prediction information list (HmvpCandList). In some examples, the decoder-side device may update the historical motion vector prediction information list according to motion information, BgcFlag and BgcIndex of a current prediction block.

When the decoder-side device determines that the current coding unit does not meet at least one of the above conditions, the decoder-side device may not update the historical motion vector prediction information list.

In some embodiments, determining the number of motion vector angle prediction candidate motion information according to the value of the enhanced temporal motion vector prediction and motion vector angle prediction enable flag may include: when the value of the enhanced temporal motion vector prediction and motion vector angle prediction enable flag is 1, determining that the number of motion vector angle prediction candidate motion information is 5, where the value of the enhanced temporal motion vector prediction and motion vector angle prediction enable flag being 1 indicates that the enhanced temporal motion vector prediction and the motion vector angle prediction can be used; and when the value of the enhanced temporal motion vector prediction and motion vector angle prediction enable flag is 0, or the enhanced temporal motion vector prediction and motion vector angle prediction enable flag is not carried in a bitstream, determining that the number of motion vector angle prediction candidate motion information is 0, where the value of the enhanced temporal motion vector prediction and motion vector angle prediction enable flag being 0, or the enhanced temporal motion vector prediction and motion vector angle prediction enable flag not carried in the bitstream, indicates that the enhanced temporal motion vector prediction and the motion vector angle prediction should not be used.

In some examples, the enhanced temporal motion vector prediction and motion vector angle prediction enable flag may be used to indicate whether the enhanced temporal motion vector prediction and the motion vector angle prediction can be used.

In some examples, the value of the enhanced temporal motion vector prediction and motion vector angle prediction enable flag is 1, indicating that the enhanced temporal motion vector prediction and the motion vector angle prediction can be used; and the value of the enhanced temporal motion vector prediction and motion vector angle prediction enable flag is 0, indicating that the enhanced temporal motion vector prediction and the motion vector angle prediction should not be used.

In some examples, when receiving the bitstream, the decoder-side device may parse the value of the enhanced temporal motion vector prediction and motion vector angle prediction enable flag.

When the value of the enhanced temporal motion vector prediction and motion vector angle prediction enable flag is 1, that is, the enhanced temporal motion vector prediction and the motion vector angle prediction can be used, and the decoder-side device may determine that NumOfMvapCand is 5.

When the value of the enhanced temporal motion vector prediction and motion vector angle prediction enable flag is 0, that is, the enhanced temporal motion vector prediction and the motion vector angle prediction can not be used, and the decoder-side device may determine that NumOfMvapCand is 0.

In some examples, when the decoder-side device does not parse the enhanced temporal motion vector prediction and motion vector angle prediction enable flag from the bitstream, the value of the enhanced temporal motion vector prediction and motion vector angle prediction enable flag may be determined as 0, that is, the enhanced temporal motion vector prediction and the motion vector angle prediction can not be used, and the decoder-side device may determine that NumOfMvapCand is 0.

Referring to FIG. 9, which is a schematic flowchart illustrating a coding method according to an embodiment of the present disclosure, the coding method may be performed by a coder-side device. As shown in FIG. 9, the coding method may include the following steps.

At step S900, a candidate list of a skip mode or a direct mode is constructed: each prediction mode in a prediction mode candidate list is traversed in order, for each prediction mode, motion information of a current coding unit and a motion information index value of the skip mode or the direct mode of the current coding unit are acquired.

At step S910, motion compensation is performed on the current coding unit according to the motion information of the current coding unit.

At step S920, a rate distortion optimization cost corresponding to the prediction mode is calculated and compared with rate distortion optimization costs of other candidate prediction modes, and a prediction mode with the smallest rate distortion optimization cost is selected.

At step S930, the motion information index value of the skip mode or the direct mode of the current coding unit corresponding to the prediction mode with the smallest rate distortion optimization cost is carried into a bitstream and transmitted to a decoder-side.

As shown in FIG. 10, in the step S930, carrying the motion information index value of the skip mode or the direct mode of the current coding unit corresponding to the prediction mode with the smallest rate distortion optimization cost into the bitstream may be implemented by steps S931 and S932.

At step S931, a number of motion vector angle prediction candidate motion information and a number of inter-prediction candidate historical motion vector prediction information are acquired.

At step S932, according to the number of motion vector angle prediction candidate motion information and the number of inter-prediction candidate historical motion vector prediction information, the motion information index value of the skip mode or the direct mode of the current coding unit is coded and carried into the bitstream.

In embodiments of the present disclosure, considering that maximum numbers of candidate motion information allowed to be generated by HMVP and MVAP are not fixed, and considering that a value range of the motion information index value of the skip mode or the direct mode is also not fixed, in order to improve flexibility of determining the motion information index value of the skip mode or the direct mode, a maximum index value (e.g., maxVal) is no longer fixed at 11, but may be determined according to the number of motion vector angle prediction candidate motion information and the number of inter-prediction candidate historical motion vector prediction information.

In some examples, when the coder-side device needs to code the motion information index value, NumOfMvapCand and NumOfHmvpCand may be acquired. In some examples, the coder-side device may determine NumOfMvapCand and NumOfHmvpCand through coding sequence-level high-level syntax.

In embodiments of the present disclosure, according to NumOfMvapCand and NumOfHmvpCand, the coder-side device may code the motion information index value of the skip mode or the direct mode of the current coding unit and carry the motion information index value of the skip mode or the direct mode of the current coding unit into the bitstream.

In some embodiments, in the step S932, coding the motion information index value of the skip mode or the direct mode of the current coding unit according to the number of motion vector angle prediction candidate motion information and the number of inter-prediction candidate historical motion vector prediction information may include: determining a maximum index value according to the number of motion vector angle prediction candidate motion information and the number of inter-prediction candidate historical motion vector prediction information; and coding the motion information index value of the skip mode or the direct mode of the current coding unit by using a binarization manner of truncated unary code according to the maximum index value.

In some examples, when NumOfMvapCand and NumOfHmvpCand are determined according to the above manner, the coder-side device may determine the maximum index value (i.e., maxVal) according to the determined NumOfMvapCand and NumOfHmvpCand, and according to the maxVal, code the motion information index value of the skip mode or the direct mode of the current coding unit by using the binarization manner of the truncated unary code.

In some examples, maxVal determined according to the determined NumOfMvapCand and NumOfHmvpCand is less than or equal to 11.

In some examples, considering that a maximum number of temporal candidate motion information and candidate motion information of MHBSKIP is 4, and the value of maxVal is (list length−1), therefore, maxVal can be determined according to a sum of 3 and a maximum value of NumOfMvapCand and NumOfHmvpCand.

In some examples, the coder-side device may determine maxVal in the following manner:

$$\mathrm{max}\mathit{Val} = (3 + \mathrm{Max}(\mathit{NumOfMvapCand}, \mathit{NumOfHmvpCand}))$$

Since Max(NumOfMvapCand, NumOfHmvpCand)≤8, the maxVal determined as above is less than or equal to 11. According to this maxVal, when the motion information index value of skip mode or direct mode is coded by using binarization manner of the truncated unary code, a number of bits required may be less than or equal to a number of bits required in a case of maxVal=11. Therefore, using the methods provided by the embodiments of the present disclosure may reduce the number of bits required for coding the motion information index value of the skip mode or the direct mode with a high probability, reduce coding and decoding overhead, and improve coding and decoding performance.

In an example, the above determining the maximum index value according to the number of motion vector angle prediction candidate motion information and the number of inter-prediction candidate historical motion vector prediction information may include: according to the number of motion vector angle prediction candidate motion information and the number of inter-prediction candidate historical motion vector prediction information, as well as a picture type of a current picture, determining the maximum index value.

In some examples, considering that a number of candidate motion information of MHBSKIP corresponding to different picture types may be different, for example, for a P picture, the number of candidate motion information of MHBSKIP is 1; for a B picture, the number of candidate motion information of MHBSKIP is 3.

Therefore, in order to improve flexibility of coding the motion information index value of the skip mode or the direct mode, the picture type may also be considered when coding the motion information index value of the skip mode or the direct mode. That is, the coder-side device may code the motion information index value of the skip mode or the direct mode of the current coding unit according to the number of motion vector angle prediction candidate motion information and the number of inter-prediction candidate historical motion vector prediction information, as well as the picture type of the current picture.

In some examples, the picture type may include, but is not limited to, B picture or P picture.

In some examples, the coder-side device may determine the maximum index value according to the number of motion vector angle prediction candidate motion information, the number of inter-prediction candidate historical motion vector prediction information, and the picture type of the current picture.

In some examples, considering that for the P picture, the number of candidate motion information of MHBSKIP is 1; for the B picture, the number of candidate motion information of MHBSKIP is 3.

Therefore, when the picture type of the current picture is the P picture, a sum of 1 and the maximum value of NumOfMvapCand and NumOfHmvpCand may be determined as maxVal.

When the picture type of the current picture is the B picture, a sum of 3 and the maximum value of NumOfMvapCand and NumOfHmvpCand may be determined as maxVal.

Since the number of candidate motion information of MHBSKIP takes a value of 1 for a case where the picture type is the P picture, compared with an implementation in which the number of candidate motion information of MHBSKIP is directly set to 3 regardless of the picture type, a determined value of maxVal may be reduced. Therefore, a bit overhead for coding the motion information index value of the skip mode or the direct mode by using the binarization manner of the truncated unary code may be reduced, and the coding and decoding performance may be improved.

In some examples, when the coder-side device determines maxVal according to the above manner, the motion information index value of the skip mode or the direct mode of the current coding unit may be coded by using the binarization manner of the truncated unary code according to the determined maxVal.

In order to make those skilled in the art to better understand the technical solutions provided by the embodiments of the present disclosure, the technical solutions provided by the embodiments of the present disclosure are described below in combination with specific embodiments.

In order to improve flexibility of determining an index value, reduce coding redundancy and improve coding and decoding performance, optimization solutions of embodiments of the present disclosure may include some or all of the following.

First, high-level syntax is acquired, a number of motion vector angle prediction candidate motion information (Nu-mOfMvapCand) and a number of inter-prediction candidate historical motion vector prediction information (Nu-mOfHmvpCand) are obtained, and a picture type of a current picture is acquired.

Then, a motion information index value cu_subtype_index of a skip mode or a direct mode of a current coding unit is parsed according to the picture type of the current picture, NumOfMvapCand, and NumOfHmvpCand.

Finally, ValidMvapModeNum is acquired, and whether a current coding unit type is MVAP mode or HMVP mode is determined according to cu_subtype_index and ValidMvapModeNum.

Embodiment 1. Coding Method and Coding Apparatus 1.1, a candidate list of a skip mode or a direct mode is constructed: each prediction mode in a prediction mode candidate list is traversed in order, for each prediction mode, motion information of a current coding unit and a motion information index value of the skip mode or the direct mode of the current coding unit are acquired;

1.2, motion compensation is performed on the current coding unit according to the motion information of the current coding unit;

1.3, a rate distortion optimization cost corresponding to the prediction mode is calculated and compared with rate distortion optimization costs of other candidate prediction modes, and a prediction mode with the smallest rate distortion optimization cost is selected;

1.4, the motion information index value of the skip mode or the direct mode of the current coding unit corresponding to the prediction mode with the smallest rate distortion optimization cost is carried into a bitstream and transmitted to a decoder-side.

Embodiment 2. Decoding Method and Decoding Apparatus 2.1, a bitstream is received, and a motion information index value of a skip mode or a direct mode of a current coding unit is parsed;

2.2, a candidate list of the skip mode or the direct mode is constructed;

2.3, a prediction mode of the current coding unit is determined according to the motion information index value and the candidate list of the skip mode or the direct mode of the current coding unit;

2.4, motion information of the current coding unit is acquired according to a prediction mode of the current coding unit, and motion compensation is performed on the current coding unit.

Embodiment 3

The Coding Process:
  (1) coding sequence-level high-level syntax, and acquiring a number of motion vector angle prediction candidate motion information NumOfMvapCand and a number of inter-prediction candidate historical motion vector prediction information NumOfHmvpCand;
  (2) coding a motion information index value of a skip mode or a direct mode of a current coding unit and carrying the motion information index value of the skip mode or the direct mode of the current coding unit into a bitstream according to NumOfMvapCand and NumOfHmvpCand.

The Decoding Process:

(1) acquiring the number of motion vector angle prediction candidate motion information NumOfMvapCand and the number of inter-prediction candidate historical motion vector prediction information NumOfHmvpCand by parsing the sequence-level high-level syntax;

(2) parsing the motion information index value cu_subtype_index of the skip mode or the direct mode of the current coding unit according to NumOfMvapCand and NumOfHmvpCand.

Embodiment 4

The Coding Process:

(1) coding sequence-level high-level syntax etmvp_mvap_enable_flag and num_of_hmvp_cand.

In some examples, a value of NumOfMvapCand is etmvp_mvap_enable_flag==1?5:0, where a value range of etmvp_mvap_enable_flag is from 0 to 1;

The value of NumOfMvapCand is etmvp_mvap_enable_flag==1?5:0, indicating that: when a value of etmvp_mvap_enable_flag is 1, the value of NumOfMvapCand is 5; when the value of etmvp_mvap_enable_flag is not 1, that is, when the value of etmvp_mvap_enable_flag is 0, the value of NumOfMvapCand is 0 (the same below).

In some examples, a value of NumOfHmvpCand is num_of_hmvp_cand, where a value range of num_of_hmvp_cand is from 0 to 8.

(2) coding a motion information index value cu_subtype_index of a skip mode or a direct mode of a current coding unit by using a binarization manner of truncated unary code, and carrying the motion information index value cu_subtype_index of the skip mode or the direct mode of the current coding unit into a bitstream.

In some examples, maxVal=(3+Max(NumOfMvapCand, NumOfHmvpCand)).

The Decoding Process:

(1) parsing the sequence-level high-level syntax etmvp_mvap_enable_flag and num_of_hmvp_cand.

In some examples, the value of NumOfMvapCand is etmvp_mvap_enable_flag==1?5:0, where the value range of etmvp_mvap_enable_flag is from 0 to 1;

In some examples, the value of NumOfHmvpCand is num_of_hmvp_cand, where the value range of num_of_hmvp_cand is from 0 to 8.

(2) parsing the motion information index value cu_subtype_index of the skip mode or the direct mode of the current coding unit by using an inverse binarization manner of the truncated unary code.

In some examples, maxVal=(3+Max(NumOfMvapCand, NumOfHmvpCand)).

Embodiment 5

The Coding Process:

(1) coding sequence-level high-level syntax, and acquiring a number of motion vector angle prediction candidate motion information NumOfMvapCand and a number of inter-prediction candidate historical motion vector prediction information NumOfHmvpCand;

(2) coding a motion information index value of a skip mode or a direct mode of a current coding unit and carrying the motion information index value of the skip mode or the direct mode of the current coding unit into a bitstream according to a picture type of a current picture, NumOfMvapCand, and NumOfHmvpCand.

The Decoding Process:

(1) acquiring the number of motion vector angle prediction candidate motion information NumOfMvapCand and the number of inter-prediction candidate historical motion vector prediction information NumOfHmvpCand by parsing the sequence-level high-level syntax;

(2) parsing the motion information index value cu_subtype_index of the skip mode or the direct mode of the current coding unit according to the picture type of the current picture, NumOfMvapCand, and NumOfHmvpCand.

Embodiment 6

The Coding Process:

(1) coding sequence-level high-level syntax etmvp_mvap_enable_flag and num_of_hmvp_cand.

In some examples, a value of NumOfMvapCand is etmvp_mvap_enable_flag==1?5:0, where a value range of etmvp_mvap_enable_flag is from 0 to 1.

In some examples, a value of NumOfHmvpCand is num_of_hmvp_cand, where a value range of num_of_hmvp_cand is from 0 to 8.

(2) coding a motion information index value cu_subtype_index of a skip mode or a direct mode of a current coding unit by using a binarization manner of truncated unary code, and carrying the motion information index value cu_subtype_index of the skip mode or the direct mode of the current coding unit into a bitstream.

In some examples, maxVal=((PictureType==1)?(1:3)+Max(NumOfMvapCand, NumOfHmvpCand)), PictureType represents a picture type of a current picture, and a value of PictureType being 1 represents that the current picture is a P picture.

The Decoding Process:

(1) parsing the sequence-level high-level syntax etmvp_mvap_enable_flag and num_of_hmvp_cand.

In some examples, the value of NumOfMvapCand is etmvp_mvap_enable_flag==1?5:0, where the value range of etmvp_mvap_enable_flag is from 0 to 1.

In some examples, the value of NumOfHmvpCand is num_of_hmvp_cand, where the value range of num_of_hmvp_cand is from 0 to 8.

(2) parsing the motion information index value cu_subtype_index of the skip mode or the direct mode of the current coding unit by using an inverse binarization manner of the truncated unary code.

In some examples, maxVal=((PictureType==1)?(1:3)+Max(NumOfMvapCand, NumOfHmvpCand)), PictureType represents the picture type of the current picture, and the value of PictureType being 1 represents that the current picture is a P picture.

maxVal=((PictureType==1)?(1:3)+Max(NumOfMvapCand, NumOfHmvpCand)) indicates that: when the value of PictureType is 1, maxVal=1+Max(NumOfMvapCand, NumOfHmvpCand); when the value of Picture Type is not 1, maxVal=3+Max(NumOfMvapCand, NumOfHmvpCand) (the same below).

Embodiment 7

The Coding Process:

(1) coding sequence-level high-level syntax, and acquiring a number of motion vector angle prediction candidate motion information NumOfMvapCand and a number of inter-prediction candidate historical motion vector prediction information NumOfHmvpCand;

(2) acquiring ValidMvapModeNum, and determining whether a current coding unit type is an MVAP mode or an HMVP mode according to a motion information index value cu_subtype_index of a skip mode or a direct mode of a current coding unit and ValidMvapModeNum.

(3) coding cu_subtype_index according to NumOfMvapCand and NumOfHmvpCand, and carrying coded cu_subtype_index into a bitstream.

The Decoding Process:

(1) acquiring the number of motion vector angle prediction candidate motion information NumOfMvapCand and the number of inter-prediction candidate historical motion vector prediction information NumOfHmvpCand by parsing the sequence-level high-level syntax;

(2) parsing the motion information index value cu_subtype_index of the skip mode or the direct mode of the current coding unit according to NumOfMvapCand and NumOfHmvpCand;

(3) acquiring ValidMvapModeNum, and determining whether the current coding unit type is Mvap mode or HMVP mode according to cu_subtype_index and ValidMvapModeNum.

Embodiment 8

The Coding Process:

(1) coding sequence-level high-level syntax etmvp_mvap_enable_flag and num_of_hmvp_cand.

In some examples, a value of NumOfMvapCand is etmvp_mvap_enable_flag==1?5:0, where a value range of etmvp_mvap_enable_flag is from 0 to 1.

In some examples, a value of NumOfHmvpCand is num_of_hmvp_cand, where a value range of num_of_hmvp_cand is from 0 to 8.

(2) acquiring a valid motion vector angle prediction mode number ValidMvapModeNum, if CuSubTypeIndex is greater than or equal to N, then:

when ValidMvapModeNum is greater than 0, and CuSubTypeIndex is less than N+ValidMvapModeNum, determining that the current coding unit type is an MVAP mode;

when ValidMvapModeNum is equal to 0, or CuSubTypeIndex is greater than or equal to N+ValidMvapModeNum, determining that the current coding unit type is an HMVP mode.

In some examples, if the current picture is a P picture, N=2, and if the current picture is a B picture, N=4.

(3) coding a motion information index value cu_subtype_index of a skip mode or a direct mode of a current coding unit by using a binarization manner of truncated unary code, and carrying the motion information index value cu_subtype_index of the skip mode or the direct mode of the current coding unit into a bitstream.

In some examples, maxVal=(3+Max(NumOfMvapCand, NumOfHmvpCand)).

The Decoding Process:

(1) parsing the sequence-level high-level syntax etmvp_mvap_enable_flag and num_of_hmvp_cand.

In some examples, the value of NumOfMvapCand is etmvp_mvap_enable_flag==1?5:0, where the value range of etmvp_mvap_enable_flag is from 0 to 1.

In some examples, the value of NumOfHmvpCand is num_of_hmvp_cand, where the value range of num_of_hmvp_cand is from 0 to 8.

(2) parsing the motion information index value cu_subtype_index of the skip mode or the direct mode of the current coding unit by using an inverse binarization manner of the truncated unary code;

In some examples, maxVal=(3+Max(NumOfMvapCand, NumOfHmvpCand)).

(3) acquiring the valid motion vector angle prediction mode number ValidMvapModeNum, if CuSubTypeIndex is greater than or equal to N, then:

when ValidMvapModeNum is greater than 0, and CuSubTypeIndex is less than N+ValidMvapModeNum, determining that the current coding unit type is the MVAP mode;

when ValidMvapModeNum is equal to 0, or CuSubTypeIndex is greater than or equal to N+ValidMvapModeNum, determining that the current coding unit type is the HMVP mode.

In some examples, if the current picture is a P picture, N=2; and if the current picture is a B picture, N=4.

Embodiment 9

The Coding Process:

(1) coding sequence-level high-level syntax, and acquiring a number of motion vector angle prediction candidate motion information NumOfMvapCand and a number of inter-prediction candidate historical motion vector prediction information NumOfHmvpCand;

(2) acquiring ValidMvapModeNum, and determining whether a current coding unit type is an MVAP mode or an HMVP mode according to a motion information index value cu_subtype_index of a skip mode or a direct mode of a current coding unit and ValidMvapModeNum.

(3) coding cu_subtype_index according to a picture type of a current picture, NumOfMvapCand, and NumOfHmvpCand, and carrying the coded cu_subtype_index into a bitstream.

The Decoding Process:

(1) acquiring the number of motion vector angle prediction candidate motion information NumOfMvapCand and the number of inter-prediction candidate historical motion vector prediction information NumOfHmvpCand by parsing the sequence-level high-level syntax;

(2) parsing the motion information index value cu_subtype_index of the skip mode or the direct mode of the current coding unit according to the picture type of the current picture, NumOfMvapCand, and NumOfHmvpCand;

(3) acquiring ValidMvapModeNum, and determining whether the current coding unit type is the MVAP mode or the HMVP mode according to cu_subtype_index and ValidMvapModeNum.

Embodiment 10

The Coding Process:

(1) coding sequence-level high-level syntax etmvp_mvap_enable_flag and num_of_hmvp_cand;

In some examples, a value of NumOfMvapCand is etmvp_mvap_enable_flag==1?5:0, where a value range of etmvp_mvap_enable_flag is from 0 to 1.

In some examples, a value of NumOfHmvpCand is num_of_hmvp_cand, where a value range of num_of_hmvp_cand is from 0 to 8.

(2) acquiring a valid motion vector angle prediction mode number ValidMvapModeNum, if CuSubTypeIndex is greater than or equal to N, then:

when ValidMvapModeNum is greater than 0, and CuSub-TypeIndex is less than N+ValidMvapModeNum, a current coding unit type is an MVAP mode;

when ValidMvapModeNum is equal to 0, or CuSubTypeIndex is greater than or equal to N+ValidMvapModeNum, the current coding unit type is an HMVP mode.

In some examples, if a current picture is a P picture, N=2; and if the current picture is a B picture, N=4.

(3) coding a motion information index value cu_subtype_index of a skip mode or a direct mode of a current coding unit by using a binarization manner of truncated unary code, and carrying the motion information index value cu_subtype_index of the skip mode or the direct mode of the current coding unit into a bitstream.

In some examples, maxVal=((PictureType==1)?(1:3)+Max(NumOfMvapCand, NumOfHmvpCand)), PictureType represents a picture type of the current picture, and a value of PictureType of 1 represents that the current picture is a P picture.

The Decoding Process:

(1) parsing the sequence-level high-level syntax etmvp_mvap_enable_flag and num_of_hmvp_cand;

In some examples, the value of NumOfMvapCand is etmvp_mvap_enable_flag==1?5:0, where the value range of etmvp_mvap_enable_flag is from 0 to 1.

In some examples, the value of NumOfHmvpCand is num_of_hmvp_cand, where the value range of num_of_hmvp_cand is from 0 to 8.

(2) parsing the motion information index value cu_subtype_index of the skip mode or the direct mode of the current coding unit by using an inverse binarization manner of the truncated unary code.

In some examples, maxVal=((PictureType==1)?(1:3)+Max(NumOfMvapCand, NumOfHmvpCand)), PictureType represents the picture type of the current picture, and the value of PictureType being 1 represents that the current picture is a P picture.

(3) acquiring the valid motion vector angle prediction mode number ValidMvapModeNum, if CuSubTypeIndex is greater than or equal to N, then:

when ValidMvapModeNum is greater than 0, and CuSub-TypeIndex is less than N+ValidMvapModeNum, the current coding unit type is MVAP mode;

when ValidMvapModeNum is equal to 0, or CuSubTypeIndex is greater than or equal to N+ValidMvapModeNum, the current coding unit type is HMVP mode.

In some examples, if the current picture is a P picture, N=2; and if the current picture is a B picture, N=4.

Embodiment 11

Sequence-level high-level syntax etmvp_mvap_enable_flag is coded and decoded, ETMVP and MVAP are controlled.

In some examples, whether to enable ETMVP and MVAP may be identified by etmvp_mvap_enable_flag.

In some examples, the syntax description can be shown in the following table:

| | Descriptor |
|---|---|
| Sequence Header Definition | |
| if (profile_id == 0x30 \|\| profile_id == 0x32) { | |
| etmvp_mvap_enable_flag | u(1) |
| } | |

Semantic Description:

enhanced temporal motion vector prediction and motion vector angle prediction enable flag (etmvp_mvap_enable_flag):

a binary variable. A value of '1' represents that the enhanced temporal motion vector prediction and the motion vector angle prediction can be used; a value of '0' represents that the enhanced temporal motion vector prediction and the motion vector angle prediction should not be used. A value of EtmvpMvapEnableFlag is equal to the value of etmvp_mvap_enable_flag.

In some examples, if etmvp_mvap_enable_flag is not carried in a bitstream, the value of EtmvpMvapEnableFlag is 0.

If the value of EtmvpMvapEnableFlag is 1, a value of NumOfMvapCand is equal to 5; otherwise, the value of NumOfMvapCand is equal to 0.

Embodiment 12

After completing decoding of a current prediction unit (i.e., a current coding unit), if the current prediction unit is an inter prediction unit and is not an enhanced temporal motion vector prediction unit and is not a motion vector angle prediction unit and is not a subblock-based temporal motion information prediction unit, and when NumOfHmvpCand (the number of motion information that can be updated) is greater than 0, a historical motion vector prediction information list HmvpCandList is updated according to motion information of the current prediction block, BgcFlag and BgcIndex;

otherwise, that is, if at least one of conditions such as NumOfHmvpCand=0, the current prediction unit is not an inter prediction unit, the current prediction unit is an enhanced temporal motion vector prediction unit, the current prediction unit is a motion vector angle prediction unit, or the current prediction unit is a subblock-based temporal motion information prediction unit is satisfied, the historical motion vector prediction information list is not updated.

Embodiment 13

After completing decoding of a current prediction unit (i.e., a current block), if the current prediction unit is an inter prediction unit and is not an affine prediction unit and is not an angle weighted prediction unit and is not an enhanced temporal motion vector prediction unit and is not a motion vector angle prediction unit and is not a subblock-based temporal motion information prediction unit, and when NumOfHmvpCand (the number of motion information that can be updated) is greater than 0, a historical motion vector prediction information list HmvpCandList is updated according to motion information of the current prediction block, BgcFlag and BgcIndex; otherwise, that is, if at least one of conditions such as NumOfHmvpCand=0, the current prediction unit is not an inter prediction unit, the current prediction unit is an affine prediction unit, the current prediction unit is an angle weighted prediction unit, the current prediction unit is an enhanced temporal motion vector prediction unit, the current prediction unit is a motion vector angle prediction unit, or the current prediction unit is a subblock-based temporal motion information prediction unit is satisfied, the historical motion vector prediction information list is not updated.

It should be noted that the above embodiments are only specific examples of implementations of the embodiments in the present disclosure, rather than limiting scopes of the present disclosure.

Moreover, implementation processes of the coder-side and decoder-side in the above embodiments can be mutually referenced.

Figure 11:
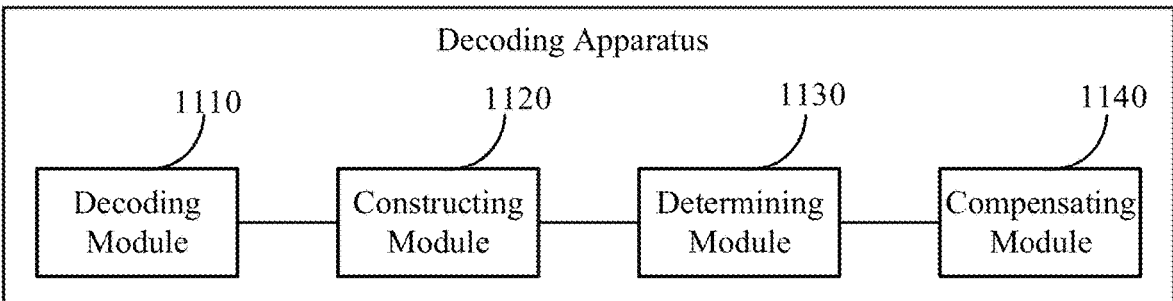
FIG. 11 is a schematic diagram illustrating a structure of a decoding apparatus according to an exemplary embodiment of the present disclosure.

The method according to the present disclosure is described above. Descriptions will be made below to apparatuses provided by the present disclosure. Referring to FIG. 11, FIG. 11 is a schematic structural diagram of a decoding apparatus according to an example of the present disclosure. The decoding apparatus may include: a decoding module 1110, configured to receive a bitstream, and parse a motion information index value of a skip mode or a direct mode of a current coding unit; a constructing module 1120, configured to construct a candidate list of the skip mode or the direct mode; a determining module 1130, configured to determine a prediction mode of the current coding unit according to the motion information index value and the candidate list of the skip mode or the direct mode of the current coding unit; and a compensating module 1140, configured to acquire motion information of the current coding unit according to the prediction mode of the current coding unit, and perform motion compensation on the current coding unit. The decoding module 1110 is specifically configured to acquire a number of motion vector angle prediction candidate motion information and a number of inter-prediction candidate historical motion vector prediction information; and according to the number of motion vector angle prediction candidate motion information and the number of inter-prediction candidate historical motion vector prediction information, determine the motion information index value of the skip mode or the direct mode of the current coding unit.

In some embodiments, the decoding module 1110 is specifically configured to acquire the number of motion vector angle prediction candidate motion information and the number of inter-prediction candidate historical motion vector prediction information by parsing sequence-level high-level syntax.

In some embodiments, the decoding module 1110 is specifically configured to parse an enhanced temporal motion vector prediction and motion vector angle prediction enable flag, determine the number of motion vector angle prediction candidate motion information according to the enhanced temporal motion vector prediction and motion vector angle prediction enable flag; and parse an index of the number of inter-prediction candidate historical motion vector prediction information, determine the number of inter-prediction candidate historical motion vector prediction information according to a value of the index of the number of inter-prediction candidate historical motion vector prediction information; where the enhanced temporal motion vector prediction and motion vector angle prediction enable flag is used to indicate that an enhanced temporal motion vector prediction mode and a motion vector angle prediction mode are enabled simultaneously, or that the enhanced temporal motion vector prediction mode and the motion vector angle prediction mode are disabled simultaneously.

In some embodiments, the determining module 1130 is specifically configured to, according to the number of motion vector angle prediction candidate motion information, the number of inter-prediction candidate historical motion vector prediction information, and a picture type of a current picture, determine the motion information index value of the skip mode or the direct mode of the current coding unit.

In some embodiments, the determining module 1130 is specifically configured to, according to the number of motion vector angle prediction candidate motion information, the number of inter-prediction candidate historical motion vector prediction information, and the picture type of the current picture, determine a maximum index value; and according to the maximum index value, parse the motion information index value of the skip mode or the direct mode of the current coding unit by using an inverse binarization manner of truncated unary code.

In some embodiments, the determining module 1130 is specifically configured to determine a maximum value of the number of motion vector angle prediction candidate motion information and the number of inter-prediction candidate historical motion vector prediction information; if the picture type of the current picture is a P picture, a sum of the maximum value and 1 is determined as the maximum index value; if the picture type of the current picture is a B picture, a sum of the maximum value and 3 is determined as the maximum index value.

In some embodiments, the determining module 1130 is specifically configured to, according to a valid motion vector angle prediction mode number and the motion information index value of the skip mode or the direct mode, determine whether the prediction mode of the current coding unit is a motion vector angle prediction mode or a history-based motion vector prediction mode.

In some embodiments, the determining module 1130 is specifically configured to, if the motion information index value of the skip mode or the direct mode is greater than or equal to N, then: when the valid motion vector angle prediction mode number is greater than 0, and the motion information index value of the skip mode or the direct mode is less than a sum of N and the valid motion vector angle prediction mode number, determine that the prediction mode of the current coding unit is a motion vector angle prediction mode; when the valid motion vector angle prediction mode number is equal to 0, or the motion information index value of the skip mode or the direct mode is greater than or equal to the sum of N and the valid motion vector angle prediction mode number, determine that the prediction mode of the current coding unit is the history-based motion vector prediction mode.

In some embodiments, if the picture type of the current picture is a P picture, N=2; if the picture type of the current picture is a B picture, N=4.

In some embodiments, the determining module 1130 is further configured to, when the prediction mode of the current coding unit is the history-based motion vector prediction mode, if the current coding unit is an inter prediction unit and is not an affine prediction unit and is not an angle weighted prediction unit and is not an enhanced temporal motion vector prediction unit and is not a motion vector angle prediction unit and is not a subblock-based temporal motion information prediction unit, and if the number of inter-prediction candidate historical motion vector prediction information is greater than 0, update a historical motion vector prediction information list. Otherwise, the historical motion vector prediction information list is not updated.

In some embodiments, the decoding module 1110 is specifically configured to, when the value of the enhanced temporal motion vector prediction and motion vector angle prediction enable flag is 1, it is determined that the number of motion vector angle prediction candidate motion information is 5, where the value of the enhanced temporal motion vector prediction and motion vector angle prediction enable flag being 1, indicates that the current coding unit can use enhanced temporal motion vector prediction and motion vector angle prediction; and when the value of the enhanced temporal motion vector prediction and motion vector angle prediction enable flag is 0, or the enhanced temporal motion vector prediction and motion vector angle prediction enable flag is not carried in a bitstream, it is determined that the number of motion vector angle prediction candidate motion information is 0, where the value of the enhanced temporal motion vector prediction and motion vector angle prediction enable flag being 0, or the enhanced temporal motion vector prediction and motion vector angle prediction enable flag not carrying in the bitstream, indicates that the current coding unit should not use the enhanced temporal motion vector prediction and the motion vector angle prediction.

Figure 12:
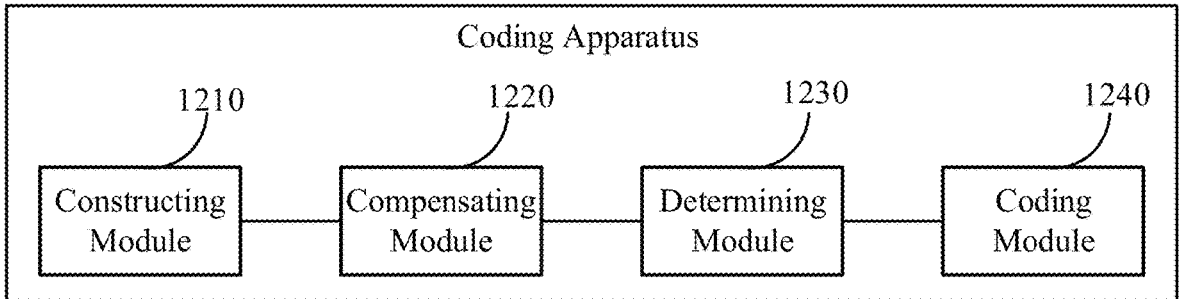
FIG. 12 is a schematic diagram illustrating a structure of a coding apparatus according to an exemplary embodiment of the present disclosure.

Referring to FIG. 12, FIG. 12 is a schematic structural diagram of a coding apparatus according to an example of the present disclosure. The coding apparatus may include: a constructing module 1210, configured to construct a candidate list of a skip mode or a direct mode: traverse each prediction mode in the prediction mode candidate list in order, and for each prediction mode, acquire motion information of a current coding unit and a motion information index value of the skip mode or the direct mode of the current coding unit; a compensating module 1220, configured to perform motion compensation on the current coding unit according to the motion information of the current coding unit; a determining module 1230, configured to calculate a rate distortion optimization cost corresponding to the prediction mode, compare the rate distortion optimization cost with rate distortion optimization costs of other candidate prediction modes, and select the prediction mode corresponding to the smallest rate distortion optimization cost; a coding module 1240, configured to carry a motion information index value of the skip mode or the direct mode of the current coding unit corresponding to the prediction mode with the smallest rate distortion optimization cost into a bitstream, and transmit it to a decoding side. The coding module 1240 is specifically configured to acquire a number of motion vector angle prediction candidate motion information and a number of inter-prediction candidate historical motion vector prediction information; according to the number of motion vector angle prediction candidate motion information and the number of inter-prediction candidate historical motion vector prediction information, code the motion information index value of the skip mode or the direct mode of the current coding unit, and carry the motion information index value of the skip mode or the direct mode of the current coding unit into the bitstream.

In some embodiments, the coding module 1240 is specifically configured to, according to the number of motion vector angle prediction candidate motion information and the number of inter-prediction candidate historical motion vector prediction information, determine a maximum index value; and according to the maximum index value, code the motion information index value of the skip mode or the direct mode of the current coding unit by using a binarization manner of truncated unary code.

In some embodiments, the coding module 1240 is specifically configured to determine the maximum index value according to the number of motion vector angle prediction candidate motion information, the number of inter-prediction candidate historical motion vector prediction information, and a picture type of a current picture.

Figure 13:
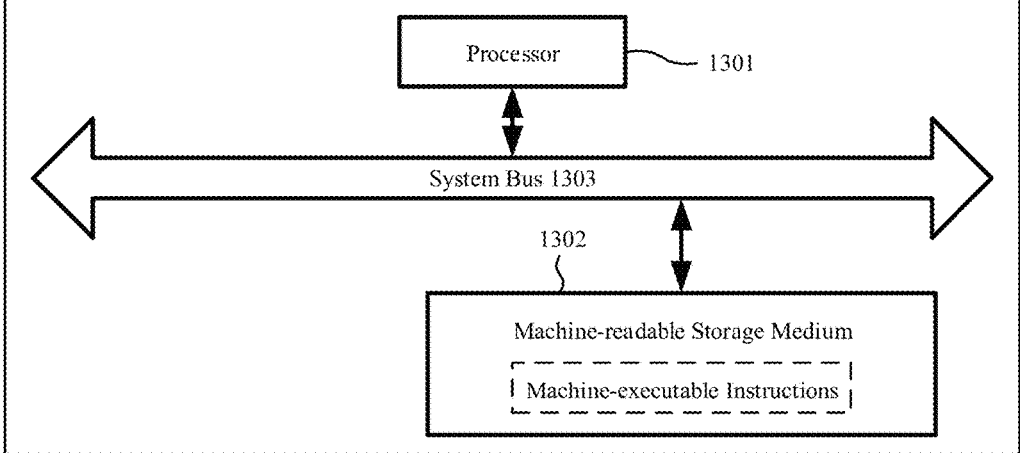
FIG. 13 is a schematic diagram illustrating a hardware structure of a decoder-side device according to an exemplary embodiment of the present disclosure.

Please refer to FIG. 13, which is a schematic diagram of a hardware structure of a decoder-side device according to an embodiment of the present disclosure. The decoder-side device may include a processor 1301 and a machine-readable storage medium 1302 storing machine-executable instructions. The processor 1301 and the machine-readable storage medium 1302 may communicate via a system bus

1303. Further, by reading and executing the machine-executable instructions stored in the machine-readable storage medium 1302 and corresponding to a decoding control logic, the processor 1301 may perform a decoding method of a decoder-side device described above.

The machine-readable storage medium 1302 mentioned in the present disclosure may be any of electronic, magnetic, optical or other physical storage apparatuses and may contain or store information such as executable instructions, data, and so on. For example, the machine-readable storage medium may be: a RAM (Radom Access Memory), a volatile memory, a non-volatile memory, a flash memory, a storage drive (such as a hard drive), a solid state hard disk, any type of storage disk (Such as optical discs, DVDs, and so on), or a similar storage medium, or a combination of them.

In some embodiments, a machine-readable storage medium is also provided, and machine-executable instructions are stored in the machine-readable storage medium, where when the machine-executable instructions are executed by a processor, a decoding method of a decoder-side device described above is implemented. For example, the machine-readable storage medium may be a ROM, a RAM, a CD-ROM, a magnetic tape, a floppy disk, an optical data storage device, and so on.

Figure 14:
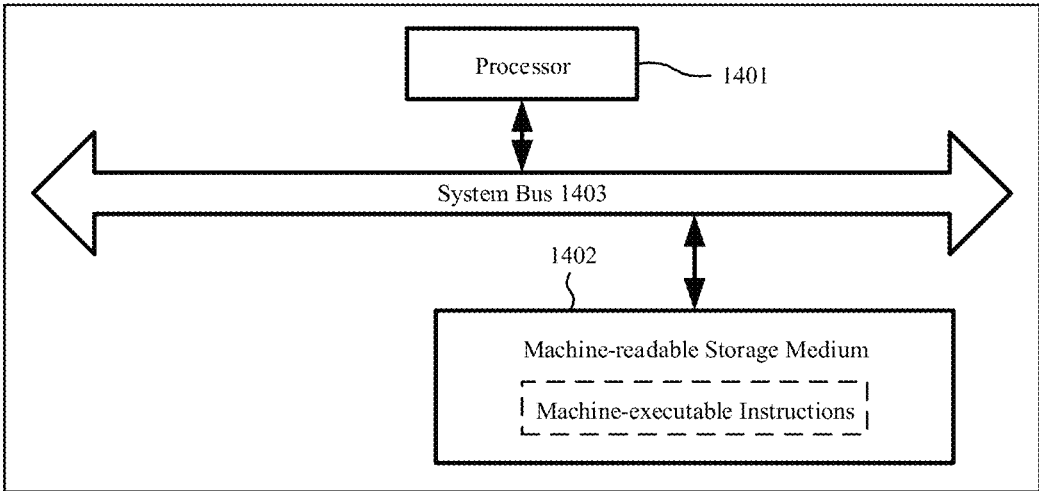
FIG. 14 is a schematic diagram illustrating a hardware structure of a coder-side device according to an exemplary embodiment of the present disclosure.

Please refer to FIG. 14, which is a schematic diagram of a hardware structure of a coder-side device according to an embodiment of the present disclosure. The coder-side device may include a processor 1401 and a machine-readable storage medium 1402 storing machine-executable instructions. The processor 1401 and the machine-readable storage medium 1402 may communicate via a system bus 1403. Further, by reading and executing the machine-executable instructions stored in the machine-readable storage medium 1402 and corresponding to a coding control logic, the processor 1401 may perform a coding method of a coder-side device described above.

The machine-readable storage medium 1402 mentioned in the present disclosure may be any of electronic, magnetic, optical or other physical storage apparatuses and may contain or store information such as executable instructions, data, and so on. For example, the machine-readable storage medium may be: a RAM (Radom Access Memory), a volatile memory, a non-volatile memory, a flash memory, a storage drive (such as a hard drive), a solid state hard disk, any type of storage disk (Such as optical discs, DVDs, and so on), or a similar storage medium, or a combination of them.

In some embodiments, a non-transitory machine-readable storage medium is also provided, and machine-executable instructions are stored in the machine-readable storage medium, where when the machine-executable instructions are executed by a processor, a coding method of a coder-side device described above is implemented. For example, the machine-readable storage medium may be a ROM, a RAM, a CD-ROM, a magnetic tape, a floppy disk, an optical data storage device, and so on. In some embodiments, a camera device is also provided, including a decoding apparatus and/or a coding apparatus in any of the above embodiments.

The relational terms such as "first" and "second" used herein are merely intended to distinguish one entity or operation from another entity or operation rather than to require or imply any such actual relation or order existing between these entities or operations. Further, the terms "including", "comprising" "containing" or any variation thereof is intended to encompass non-exclusive inclusion, so that a process, method, article or device including a series of elements includes not only those elements but also other elements not listed explicitly or those elements inherent to such a process, method, article, apparatus or device. Without more restrictions, the elements defined by the sentence "including a . . . " do not exclude the existence of other identical elements in the process, method, product, apparatus or device including the elements.

The above are only examples of the present disclosure and not intended to limit this disclosure. Any modification, equivalent replacement, improvement, and the like made within the spirit and principle of the present disclosure shall be included in the protection scope of the present disclosure.

The invention claimed is:

1. A decoding method, comprising:
receiving a bitstream and parsing a motion information index value of a skip mode or a direct mode of a current coding unit;
constructing a candidate list of the skip mode or the direct mode;
determining a prediction mode of the current coding unit according to the motion information index value and the candidate list of the skip mode or the direct mode of the current coding unit;
acquiring motion information of the current coding unit according to the prediction mode of the current coding unit; and
performing motion compensation on the current coding unit;
wherein the parsing the motion information index value of the skip mode or the direct mode of the current coding unit comprises:
acquiring a number of motion vector angle prediction candidate motion information and a number of inter-prediction candidate historical motion vector prediction information; and
determining the motion information index value of the skip mode or the direct mode of the current coding unit according to the number of motion vector angle prediction candidate motion information and the number of inter-prediction candidate historical motion vector prediction information;
wherein the acquiring the number of motion vector angle prediction candidate motion information and the number of inter-prediction candidate historical motion vector prediction information comprises:
parsing sequence-level high-level syntax to acquire the number of motion vector angle prediction candidate motion information and the number of inter-prediction candidate historical motion vector prediction information.

2. The method according to claim 1, wherein the determining the motion information index value of the skip mode or the direct mode of the current coding unit according to the number of motion vector angle prediction candidate motion information and the number of inter-prediction candidate historical motion vector prediction information comprises:
determining the motion information index value of the skip mode or the direct mode of the current coding unit according to the number of motion vector angle prediction candidate motion information, the number of inter-prediction candidate historical motion vector prediction information, and a picture type of a current picture.

3. The method according to claim 2, wherein the determining the motion information index value of the skip mode or the direct mode of the current coding unit according to the number of motion vector angle prediction candidate motion information, the number of inter-prediction candidate historical motion vector prediction information, and the picture type of the current picture comprises:
determining a maximum index value according to the number of motion vector angle prediction candidate motion information, the number of inter-prediction candidate historical motion vector prediction information, and the picture type of the current picture; and
parsing, according to the maximum index value, the motion information index value of the skip mode or the direct mode of the current coding unit by using an inverse binarization manner of truncated unary code.

4. The method according to claim 3, wherein the determining the maximum index value according to the number of motion vector angle prediction candidate motion information, the number of inter-prediction candidate historical motion vector prediction information, and the picture type of the current picture comprises:
determining a maximum value of the number of motion vector angle prediction candidate motion information and the number of inter-prediction candidate historical motion vector prediction information;
in response to determining that the picture type of the current picture is a P picture, determining a sum of the maximum value and 1 as the maximum index value; and
in response to determining that the picture type of the current picture is a B picture, determining a sum of the maximum value and 3 as the maximum index value.

5. The method according to claim 1, wherein the determining the prediction mode of the current coding unit according to the motion information index value and the candidate list of the skip mode or the direct mode of the current coding unit comprises:
determining whether the prediction mode of the current coding unit is a Motion Vector Angle Prediction (MVAP) mode or a History-based Motion Vector Prediction (HMVP) mode according to a valid motion vector angle prediction mode number and the motion information index value of the skip mode or the direct mode.

6. The method according to claim 5, wherein the determining whether the prediction mode of the current coding unit is the MVAP mode or the HMVP mode according to the valid motion vector angle prediction mode number and the motion information index value of the skip mode or the direct mode comprises:
in response to determining that the motion information index value of the skip mode or the direct mode is greater than or equal to N:
in response to determining that the valid motion vector angle prediction mode number is greater than 0, and the motion information index value of the skip mode or the direct mode is less than a sum of N and the valid motion vector angle prediction mode number, determining that the prediction mode of the current coding unit is the MVAP mode;
in response to determining that the valid motion vector angle prediction mode number is equal to 0, or in response to determining that the motion information index value of the skip mode or the direct mode is greater than or equal to the sum of N and the valid motion vector angle prediction mode number, determining that the prediction mode of the current coding unit is the HMVP mode.

7. The method according to claim 6, wherein in response to determining that the picture type of the current picture is a P picture, N=2; and in response to determining that the picture type of the current picture is a B picture, N=4.

8. The method according to claim 5, after the determining the prediction mode of the current coding unit, further comprising:

in response to determining that the prediction mode of the current coding unit is the HMVP mode, the current coding unit is an inter prediction unit and is not an affine prediction unit and is not an angle weighted prediction unit and is not an enhanced temporal motion vector prediction unit and is not a motion vector angle prediction unit and is not a subblock-based temporal motion information prediction unit, and the number of inter-prediction candidate historical motion vector prediction information is greater than 0, updating a historical motion vector prediction information list; otherwise, not updating the historical motion vector prediction information list.

9. A coding method, comprising:

constructing a candidate list of a skip mode or a direct mode: traversing each of prediction modes in a prediction mode candidate list in order, for each of the prediction modes, acquiring motion information of a current coding unit and a motion information index value of the skip mode or the direct mode of the current coding unit;

performing motion compensation on the current coding unit according to the motion information of the current coding unit;

calculating a rate distortion optimization cost corresponding to the prediction mode, comparing the rate distortion optimization cost with rate distortion optimization costs of other candidate prediction modes, and selecting a prediction mode with a smallest rate distortion optimization cost;

carrying a motion information index value of the skip mode or the direct mode of the current coding unit corresponding to the prediction mode with the smallest rate distortion optimization cost into a bitstream; and transmitting the bitstream to a decoder-side;

wherein the carrying the motion information index value of the skip mode or the direct mode of the current coding unit corresponding to the prediction mode with the smallest rate distortion optimization cost into the bitstream comprises:

acquiring a number of motion vector angle prediction candidate motion information and a number of inter-prediction candidate historical motion vector prediction information; and coding the motion information index value of the skip mode or the direct mode of the current coding unit according to the number of motion vector angle prediction candidate motion information and the number of inter-prediction candidate historical motion vector prediction information and carrying the coded motion information index value into the bitstream;

wherein the coding the motion information index value of the skip mode or the direct mode of the current coding unit according to the number of motion vector angle prediction candidate motion information and the number of inter-prediction candidate historical motion vector prediction information comprises:

determining a maximum index value according to the number of motion vector angle prediction candidate motion information and the number of inter-prediction candidate historical motion vector prediction information; and coding, according to the maximum index value, the motion information index value of the skip mode or the direct mode of the current coding unit by using a binarization manner of truncated unary code.

10. A decoding device, comprising:

at least one processor; and at least one machine-readable storage medium, wherein the at least one machine-readable storage medium stores machine-executable instructions executable by the at least one processor to:

receive a bitstream and parse a motion information index value of a skip mode or a direct mode of a current coding unit;

construct a candidate list of the skip mode or the direct mode;

determine a prediction mode of the current coding unit according to the motion information index value and the candidate list of the skip mode or the direct mode of the current coding unit;

acquire motion information of the current coding unit according to the prediction mode of the current coding unit; and perform motion compensation on the current coding unit, wherein the at least one processor is configured to execute the machine-executable instructions to parse the motion information index value of the skip mode or the direct mode of the current coding unit by:

acquiring a number of motion vector angle prediction candidate motion information and a number of inter-prediction candidate historical motion vector prediction information; and determining the motion information index value of the skip mode or the direct mode of the current coding unit according to the number of motion vector angle prediction candidate motion information and the number of inter-prediction candidate historical motion vector prediction information, wherein the at least one processor is configured to execute the machine-executable instructions to acquire the number of motion vector angle prediction candidate motion information and the number of inter-prediction candidate historical motion vector prediction information by:

parsing sequence-level high-level syntax to acquire the number of motion vector angle prediction candidate motion information and the number of inter-prediction candidate historical motion vector prediction information.

11. A coding device, comprising:

at least one processor; and at least one machine-readable storage medium, wherein the at least one machine-readable storage medium stores machine-executable instructions executable by the processor to perform the method according to claim 9.

12. A non-transitory machine-readable storage medium storing machine-executable instructions, wherein the machine-executable instructions are executable by at least one processor to implement the method according to claim 1.

13. A non-transitory machine-readable storage medium storing machine-executable instructions, wherein the machine-executable instructions are executable by at least one processor to implement the method according to claim 9.

* * * * *